United States Patent [19]
Isono

[11] Patent Number: 6,011,841
[45] Date of Patent: Jan. 4, 2000

[54] COMMUNICATION SERVICE METHOD AND EXCHANGE SYSTEM FOR NOTIFYING A TERMINATING SUBSCRIBER OF AN ORIGINATING SUBSCRIBER

[75] Inventor: Osamu Isono, Kawasaki, Japan

[73] Assignee: Fujitsu Limited, Kanagawa, Japan

[21] Appl. No.: 08/614,187

[22] Filed: Mar. 12, 1996

Related U.S. Application Data

[63] Continuation of application No. 08/189,559, Jan. 31, 1994, abandoned.

[30] Foreign Application Priority Data

May 18, 1993 [JP] Japan ................................. 5-115643

[51] Int. Cl.⁷ .......................... H04M 3/42; H04M 15/00
[52] U.S. Cl. ......................... 379/207; 379/113; 379/127; 379/134; 379/135
[58] Field of Search ..................................... 379/112, 113, 379/115, 116, 119, 120, 122, 131, 132, 127, 142, 201, 133, 134, 139, 265, 266, 309, 135

[56] References Cited

U.S. PATENT DOCUMENTS

| | | | |
|---|---|---|---|
| 4,924,496 | 5/1990 | Figa | 379/131 |
| 4,979,207 | 12/1990 | Baum et al. | 379/112 |
| 4,988,209 | 1/1991 | Davidson et al. | 379/113 X |
| 5,003,584 | 3/1991 | Benyacar | 379/201 |
| 5,023,904 | 6/1991 | Kaplan | 379/201 |
| 5,033,076 | 7/1991 | Jones | 379/142 |
| 5,109,399 | 4/1992 | Thompson | 379/142 |
| 5,121,423 | 6/1992 | Morihiro | 379/142 |
| 5,136,636 | 8/1992 | Wegrzynowicz | 379/201 |
| 5,153,906 | 10/1992 | Akiyama | 379/201 |
| 5,161,181 | 11/1992 | Zwick | 379/142 |
| 5,163,087 | 11/1992 | Kaplan | 379/142 |
| 5,241,586 | 8/1993 | Wilson | 379/142 |
| 5,255,183 | 10/1993 | Katz | 379/142 |
| 5,289,535 | 2/1994 | Bogart | 379/201 |
| 5,333,183 | 7/1994 | Herbert | 379/112 |
| 5,425,087 | 6/1995 | Gerber et al. | 379/134 |

FOREIGN PATENT DOCUMENTS

| | | |
|---|---|---|
| 63-204958 | 8/1988 | Japan. |
| 5-83415 | 4/1993 | Japan. |

*Primary Examiner*—Harry S. Hong
*Attorney, Agent, or Firm*—Helfgott & Karas, PC.

[57] ABSTRACT

Whenever there is an incoming call to a terminal accommodated by a terminating exchange, the terminating exchange creates incoming-call data, which contains at least the terminating subscriber's number, the originating subscriber's number and the communication time, and transmits the incoming-call basic data to a communication center. The communication center accumulates the incoming-call basic data and, in response to issuance of an output request, creates and outputs an incoming-call logging list for the requesting user on the basis of the incoming-call basic data. Further, secondary data, which includes at least the names and addresses of calling parties, is registered in a data base beforehand in correspondence with subscriber's numbers. The secondary data is combined with the incoming-call basic data to create incoming-call information, which is then stored in memory. In response to issuance of the output request, the incoming-call logging list of the requesting user is outputted based upon the incoming-call information.

29 Claims, 16 Drawing Sheets

FIG. 3A

SUBSCRIBER DATA

| SUBSCRIBER'S NUMBER | SUBSCRIBER DATA | | | |
|---|---|---|---|---|
| | STATUS OF TARIFF PAYMENT | USE/NON-USE | INCOMING-CALL INFORMATION SERVICE | - - - |
| | | | | |
| | | | | |
| - - - | - - - | - - - | - - - | - - - |

FIG. 3B

OUTGOING-CALL BASIC DATA

| ORIGINATING SUBSCRIBER'S NUMBER | ~C1 |
| TERMINATING SUBSCRIBER'S NUMBER | ~C2 |
| COMMUNICATION STARTING TIME | ~C3 |
| CALL DURATION | ~C4 |

FIG. 3C

INCOMING-CALL BASIC DATA 90

| TERMINATING SUBSCRIBER'S NUMBER | ~A1 |
| ORIGINATING SUBSCRIBER'S NUMBER | ~A2 |
| DISCLOSURE PERMISSION INDICATION | ~A3 |
| COMMUNICATION STARTING TIME | ~A4 |
| COMMUNICATION END TIME | ~A5 |
| COMMUNICATION CONDITION | ~A6 |

FIG. 16

| INCOMING-CALL LOGGING LIST ||
|---|---|
| NAME OF SUBSCRIBER | NUMBER OF SUBSCRIBER |
| PERIOD OF INCOMING CALLS | MONTH/DAY ~ MONTH/DAY |
| 1 ORIGINATING SUBSCRIBER'S NUMBER — DISCLOSURE PERMISSION INDICATION — COMMUNICATION STARTING TIME — COMMUNICATION END TIME — COMMUNICATION CONDITION — NAME — AGE — OCCUPATION — ADDRESS ||
| 2 ORIGINATING SUBSCRIBER'S NUMBER — DISCLOSURE PERMISSION INDICATION — COMMUNICATION STARTING TIME — COMMUNICATION END TIME — COMMUNICATION CONDITION ||
| 3 | |
| m | |

COMMUNICATION SERVICE METHOD AND EXCHANGE SYSTEM FOR NOTIFYING A TERMINATING SUBSCRIBER OF AN ORIGINATING SUBSCRIBER

This is a continuation, of application Ser. No. 08/189,559, filed Jan. 31, 1994, now abandoned.

BACKGROUND OF THE INVENTION

This invention relates to a communication service method and an exchange system in a communication network equipped with a function for informing a terminating side of an originating subscriber's number (originating telephone number). More particularly, the invention relates to a communication service method for providing a subscriber with incoming-call logging information, as well as a communication system for implementing this communication service.

An example of a service presently available in telephone and facsimile communications is an originating-call information service through which a user (subscriber) is notified of the circumstances under which a telephone, facsimile machine, etc., was utilized. In accordance with such an originating-call information service, a list of charging information is prepared and provided to the user along with notification of the monthly billing. The list includes, on an outgoing call-by-call basis, when each call was made (the date), to whom the call was placed (the telephone number) and how long the call was (the duration of the call). More specifically, an exchange (the originating exchange) issues an outgoing call from its own subscriber. When communication is established, the exchange creates basic data (the originating subscriber's number, the terminating subscriber's number, communication starting time, call time or communication end time) and transmits the basic data to a billing center. The latter accumulates and edits the basic data, prepares a notification of monthly billing for each user and prepares a list of charging information that is provided to the user. In general a fee is paid for the originating-call information service and the list of charging information is provided only to users who have been registered to receive the service.

With the development of the so-called "information society", there are greater opportunities to utilize communication, as a result of which communication traffic is increasing year by year. When viewed from the circumstances of communication utilization by users, this state of affairs means (a) an increase in the quantity of outgoing calls and (b) an increase in the quantity of incoming calls. Even if the quantity of outgoing calls increases, it is still possible to grasp the circumstances of communication by receiving the above-mentioned originating-call information service. With regard to incoming calls, however, there is no incoming-call information service. Consequently, the user, by his or her own management, can merely ascertain who the caller was and the length of communication (the length of the incoming call). When there is an increase in the quantity of incoming calls, the circumstances under which the calls were terminated cannot readily be grasped. In addition, the method of self-management mentioned above does not make it possible to deal with cases in which an incoming call arrives during communication or in which no response is made to an incoming call (as when an incoming call arrives when the called party is absent). Though an incoming call that arrives during communication or when the called party is absent can be dealt with separately by a call waiting service or a automatic answering telephone service function, the circumstances under which incoming calls were terminated over a certain period (one month, for example) cannot be ascertained systematically.

If an originating subscriber's number, the date and time of an incoming call, the communication conditions (which indicate the distinction between said finish of a call, termination during communication and no response by subscriber) and duration of call can be ascertained, this will be convenient because a customer list can be created with ease and a calling party with which communication could not be established can be called back. Accordingly, the need for a service through which it is possible to acquire logging information of incoming calls is great not only in ordinary households but also in stores, businesses for selling goods via communication services, canvassing companies and the mass media (newspapers and broadcasters).

A system for registering the telephone numbers of incoming calls that arrive when a line is busy is available in the prior art (see Japanese Patent Application Laid-Open No. 4-123648). According to this system, the telephone number of a calling party whose call has arrived during communication is transferred to a terminating telephone, where the telephone number is stored in an internal memory or IC card of the terminating telephone. At the end of the call, the telephone number of the calling party is displayed on a display unit. A call is placed to the calling party based upon the displayed telephone number.

A system for displaying the telephone number of a calling party is also available in the art (see Japanese Patent Application Laid-Open No. 4-137930). In this system, the times at which a wireless terminal is turned off and on are registered at an exchange in advance, and the telephone numbers and call times of calling parties whose incoming calls have arrived at the wireless terminal between the off and on times are stored in a memory. The wireless terminal is notified of this incoming-call information after the terminal is turned on the next time.

However, in the former system, only the originating telephone number of an incoming call that arrives when a line is busy is stored on the side of the terminal. In the latter system, only the originating telephone number of an incoming call that has arrived when the power supply of the wireless terminal is off is stored. As a consequence, the conventional systems do not make it possible to provide a user with a service that allows incoming calls to be logged systematically over any period of time, such as on a monthly basis. In other words, the conventional systems do not make possible a service through which the originating telephone numbers (original subscriber's numbers) of all calls terminated within a certain period, the terminating telephone numbers (terminating subscriber's numbers), date and time of termination and communication conditions (classified by normal finish, termination during communication and no response by subscriber) are stored and this terminating-call information is edited and supplied to each user in response to a request or on a periodic basis.

Furthermore, with the conventional systems, only originating telephone numbers and terminating times are stored; the names and addresses of the calling parties are not. This makes it difficult to specify the parties.

SUMMARY OF THE INVENTION

Accordingly, a first object of the present invention is to provide a communication service method, as well as an exchange system for implementing this service method, whereby a user can be furnished with all incoming-call information (originating telephone numbers, terminating telephone numbers, communication times, communication conditions, durations of calls, etc.) directed to the user.

A second object of the present invention is to provide a communication service method, as well as an exchange system for implementing this service method, whereby highly sophisticated information such as the names and addresses of originating subscribers can be combined with incoming-call information and provided to a user.

A third object of the present invention is to provide a communication service method, as well as an exchange system for implementing this service method, whereby the combining of information (telephone numbers, names and addresses, etc.) relating to originating subscribers with incoming-call information and the provision of the resulting information to an incoming subscriber can be prohibited.

A fourth object of the present invention is to provide a communication service method, as well as an exchange system for implementing this service method, whereby it is possible for a network to be readily informed, from the side of a terminal, whether or not an incoming-call information service is to be received.

A fifth object of the present invention is to provide a communication service method, as well as an exchange system for implementing this service method, whereby communication information is provided on the line in response to a request from a user.

A sixth object of the present invention is to provide a communication service method, as well as an exchange system for implementing this service method, whereby communication information over a fixed period of time is outputted on a user-by-user basis and supplied to each user.

According to the present invention, the above objects of the present invention are attained by creating incoming-call basic data, which includes at least a terminating subscriber's number, an originating subscriber's number and communication time, at a terminating exchange whenever there is an incoming call to an accommodated subscriber, holding the incoming-call basic data and, in response to a list-output request, outputting an incoming-call logging list of the requesting subscriber based upon the incoming-call basic data.

According to the present invention, the above objects are also attained by registering secondary data, which has at least names and addresses of subscribers, in a data base in advance in correspondence with subscriber's numbers, creating incoming-call basic data, which includes at least a terminating subscriber's number, an originating subscriber's number and communication time, in a terminating exchange whenever there is an incoming call to an accommodated subscriber, retrieving the secondary data conforming to the originating subscriber's number from the data base, combining this secondary data with the incoming-call basic data to create incoming-call information, holding the incoming-call information and, in response to a list-output request, outputting an incoming-call logging list of the requesting subscriber based upon the incoming-call information.

According to the present invention, the objects of the present invention are attained by indicating to a communication network, from an originating terminal, whether to permit or prohibit disclosure of information relating to an originating subscriber in an incoming-call logging list, wherein the communication network transmits permit/prohibit data to a terminating side together with an originating subscriber's number and, in a case where disclosure of the information relating to the originating subscriber has been prohibited, outputs an incoming-call logging list devoid of the originating subscriber's number.

According to the present invention, the above and other objects are attained by setting, from a terminal, whether or not a subscriber is to receive an incoming-call information service and informing an exchange of the setting, wherein the exchange registers, in correspondence with the subscriber's number, whether the service is required or not, checks in a terminating exchange, at the time termination of an incoming call, whether the terminating subscriber requires the incoming-call information service, and creates incoming-call basic data only if the service is required.

According to the present invention, an incoming-call logging list of a user is provided on a line when a list-output request has been issued from a terminal of the user via a communication line.

According to the present invention, incoming-call information is accumulated over a fixed period of time, and collectively outputted, in the form of a list, in response to a list-output request, for each and every terminating subscriber.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3A is diagram showing data stored in a main memory;

FIG. 3B is a diagram showing outgoing-call basic data;

FIG. 3C is a diagram showing incoming-call basic data;

FIG. 16 is a diagram showing the format of an incoming-call logging list;

DESCRIPTION OF THE PREFERRED EMBODIMENTS

(a) Overview of the Invention

Figure 1:
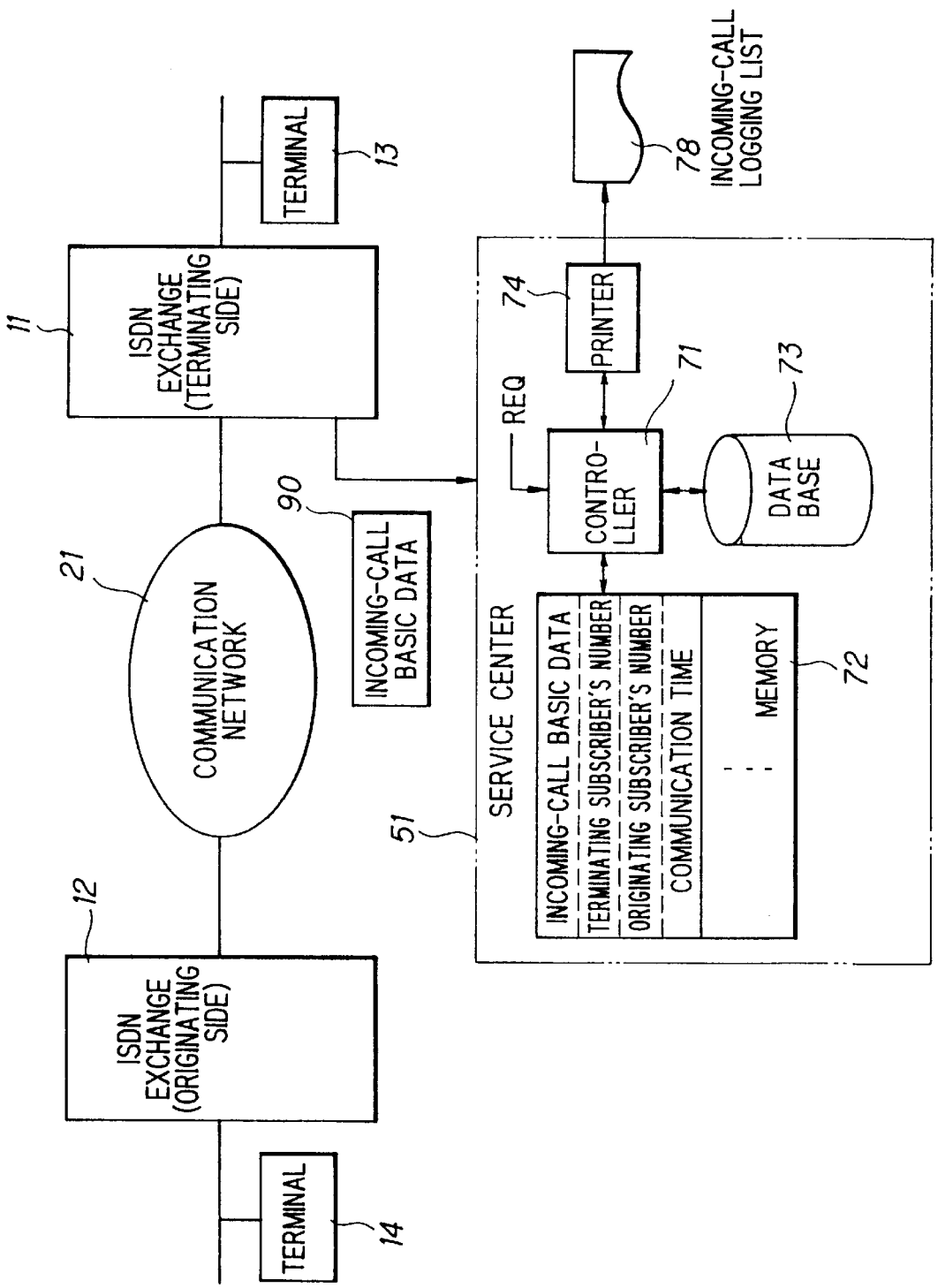
FIG. 1 is a block diagram illustrating the principles of the present invention.

FIG. 1 is a diagram of an overview of the present invention. Shown in FIG. 1 are an ISDN exchange (terminating exchange) 11 on a terminating side, an ISDN exchange (originating exchange) 12 on an originating side, ISDN terminals 13, 14 and a communication network 21 having a function according to which a terminating side is informed of the numbers of originating subscribers. Whenever there is an incoming call to a subscriber, the terminating exchange 11 creates incoming-call basic data 90 containing at least the terminating subscriber's number, the originating subscriber's number and the communication time. A service providing center (communication center) 51 outputs an incoming-call logging list for each user on the basis of incoming-call basic data. The center 51 includes a controller 71, a memory 72 for storing incoming-call information obtained by combining secondary data with incoming-call basic data, a data base 73 for storing secondary data, which includes the names and addresses of subscribers in correspondence with subscriber's numbers, and a printer 74 for printing out an incoming-call logging list for each user. Numeral 78 denotes an incoming-call logging list.

Whenever there is an incoming call to terminal 13 accommodated by a terminating exchange 11, the terminating exchange 11 creates the incoming-call data 90, which contains at least the terminating subscriber's number, the originating subscriber's number and the communication time, and transmits the incoming-call basic data to the communication center 51. The communication center 51 stores the incoming-call basic data 90 in the memory 72 and, in response to issuance of an output request signal REQ, creates and outputs an incoming-call logging list for each user based upon the incoming-call basic data that has been stored in the memory 72. This arrangement makes it possible for each user to ascertain all incoming-call terminating circumstances covered by a prescribed period of time. Further, if the incoming-call basic data is combined with communication conditions, which indicate the distinction between finish of a call, termination during communication or no response by a subscriber, as well as communication time, the user can ascertain what the terminating circumstances were in greater detail.

Furthermore, the secondary data, which includes the names and addresses of subscribers in correspondence with subscriber's numbers, is registered in the data base 73 in advance. The controller 71 retrieves secondary data, which conforms to an originating subscriber's number contained in the incoming-call basic data 90, from the data base 73, combines this secondary data with the incoming-call basic data to create incoming-call information and stores this information in the memory 72. In response to the issuance of the output request signal REQ, the controller 71 outputs the incoming-call logging list 78 to each user based upon the incoming-call information. In accordance with this arrangement, highly sophisticated information such as the names and addresses of calling parties can be combined with incoming-call information and provided to a user. This raises the utility value of the incoming-call information. By way of example, a customer list can readily be prepared from the list of incoming-call information.

Further, whether the inclusion of subscriber information in the incoming-call logging list 78 is to be permitted or prohibited is designated by the originating terminal 14. The communication network 21 transmits the permit/prohibit data to the terminating exchange 11 together with the originating subscriber's number, and the terminating exchange 11 incorporates the permit/prohibit data in the incoming-call basic data 90. The communication center 51 refers to the permit/prohibit data and, if prohibit data has been designated, refrains from combining the subscriber information (telephone number, name and address, etc.) with the incoming-call logging list 78. In accordance with this arrangement, a subscriber who does not wish his or her own telephone number, name and address, etc., to be disclosed by the incoming-call logging list is capable of readily prohibiting the disclosure of this information.

Whether or not a subscriber is to receive an incoming-call information service is set by the subscriber at the terminal 13 and the exchange 11 is so notified. The exchange 11 registers, in an internal memory and in correspondence with the subscriber's number, whether the service is required or not. At the time of termination of an incoming call, the terminating exchange 11 checks whether the terminating subscriber requires the incoming-call information service. The terminating exchange 11 creates incoming-call basic data only if the service is required and transmits this data to the communication center 51. Thus, an incoming-call information service can be received with ease.

Further, the communication center 51 is so adapted as to output an incoming-call logging list and provide the list to a user on a line when a request has been issued by the user, and off the line periodically. If this arrangement is adopted, a user can acquire an incoming-call logging list whenever necessary or periodically.

(b) Embodiment
(b-1) Overall Configuration

Figure 2:
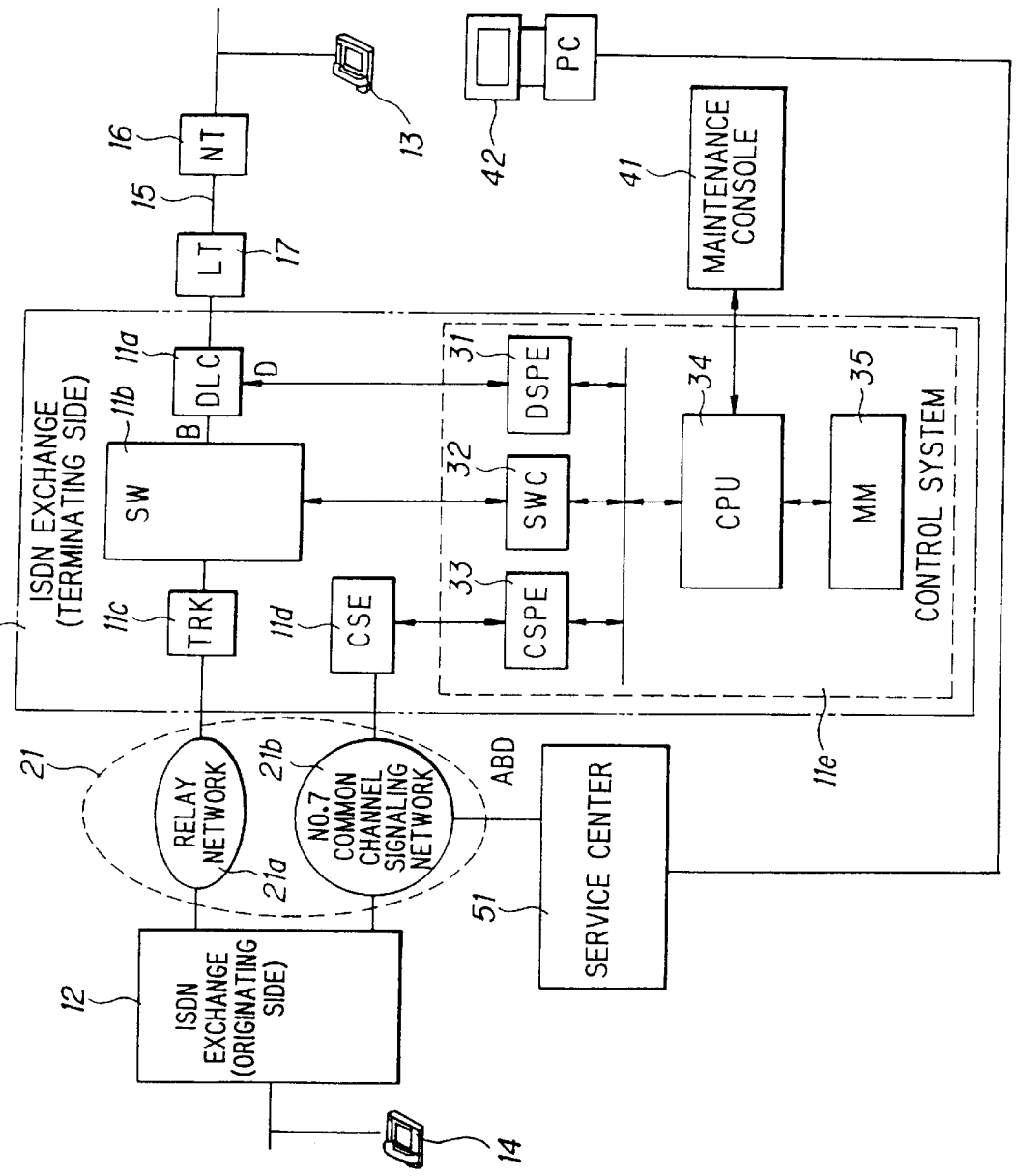
FIG. 2 is a block diagram illustrating the overall configuration of a communication system according to the present invention.

FIG. 2 is a block diagram illustrating the overall configuration of a communication system according to the present invention. Numerals 11, 12 denote the ISDN exchanges to which subscribers are connected and 13, 14 the ISDN terminals. Numeral 15 denotes a digital subscriber line. A network termination (NT) 16 terminates the digital subscriber line 15 on the side of the subscriber's home. A transmission-line termination (LN) 17 terminates the digital subscriber line 15 on the side of the exchange. A basic rate interface is employed as the user-network interface of the ISDN. The basic rate interface multiplexes a total of three channels, namely two information channels, referred to as B channels, having a transmission rate of 64 Kbit/sec, and one control-signal/information channel, referred to as a D channel, having a transmission rate of 16 Kbit/sec.

The ISDN 21 has a function in accordance with which the terminating side is notified of an originating subscriber's number. The network 21 includes a relay network 21a and a No. 7 common channel signaling network 21b. The signaling system of the ISDN employs a digital subscriber signaling system-1 (DSS-1) in the interval of the subscriber's line and a No. 7 common channel signaling system in the interval of the inter-office trunk line. A protocol (LAPD: link access procedure on the D-channel) of layer 2 and layer 3 on the D-channel for line switching is implemented by the digital subscriber signaling system, and transfer of a connection control signal corresponding to a communication line group between the ISDN exchange and relay exchange is implemented by the No. 7 common channel signaling system.

A maintenance console 41 is connected to a central processing unit 34 of the exchange 11. Numeral 42 denotes a personal computer and 51 the service providing center. The latter receives outgoing-call basic data and incoming-call basic data from the local switches 11, 12, . . . via the No. 7 common channel signaling network 21b, creates a monthly notification of billing and an incoming-call logging list for every user (subscriber) and sends these to the user. Further, the service providing center 51 creates an incoming-call logging list based upon request from the personal computer and transfers the list to the personal computer on the line.

(b-2) ISDN Exchange

The ISDN exchange 11 includes a digital subscriber's line interface circuit (DLC) 11a, a switching circuit network (SW) 11b for performing an exchange of digital information of 64 KFbit/sec, a digital trunk (TRK) 11c, common channel signaling equipment (CSE) 11d which sends and receives common channel signals between the ISDN exchange and the No. 7 common channel signaling network 21b, and a control system 11e. The control system 11e includes a DSS-1 signal processor (DSPE) 31, a switch controller (SWC) 32, a No. 7 common channel signaling processor (CSPE) 33, the central processing unit (CPU) 34 and a main memory 35.

The digital subscriber's line interface circuit 11a multiplexes and separates the information and signals on the B channels and the D channel (multiplexes in a direction down to the user and separates in a direction up from the user). The multiplexed/separated B-channels are accommodated in the down-going/up-going surfaces, respectively, of the switch circuit network 11b, and the multiplexed/separated D-channel is terminated at the DSS-1 signal processor 31. The DSS-1 signal processor 31 executes switching control of layer 3 whose data are transferred on frames of layer 2 of the D-channel in accordance with DSS-1. The No. 7 common channel signaling processor 33 performs processing for transfer of control information with another exchange in accordance with the No. 7 common channel signaling system. The switch controller 32 controls the switching of the switch circuit network 11b in accordance with a designation from the control processing unit 34. The latter executes a switching processing program successively, delivers control information between the units 31~33 and executes billing processing and processing related to an incoming-call information service. The main memory 35 stores programs, subscriber data, outgoing-call basic data for billing and incoming-call basic data for the incoming-call information service.

FIG. 3 is a diagram of subscriber data, outgoing-call basic data and incoming-call basic data stored in the main memory 35. As illustrated in FIG. 3A, the subscriber data is stored in correspondence with the numbers of subscribers (subscriber's numbers) accommodated by the ISDN exchange 11 and includes (1) status of tariff payment, (2) use/non-use status of the terminal, (3) data indicating whether various services, such as the incoming-call information service, are to be received, and so on. As shown in FIG. 3B, the outgoing-call basic data is created whenever a user is called and communicated with and is constituted by an originating subscriber's number C1, a terminating subscriber's number C2, communication starting time C3 and call duration C4, etc. The incoming-call basic data 90 is created whenever an incoming call is terminated and, as shown in FIG. 3C, is constituted by a terminating subscriber's number A1, an originating subscriber's number A2, a disclosure permission indication A3, communication starting time A4, communication end time A5 and a communication condition indication A6. The disclosure permission indication A3 indicates whether inclusion of subscriber information in the incoming-call logging list is to be permitted or prohibited. The communication indication condition A6 indicates the distinction between finish of a call, termination during communication and no response by a subscriber.

(b-3) ISDN Terminal

Figure 4:
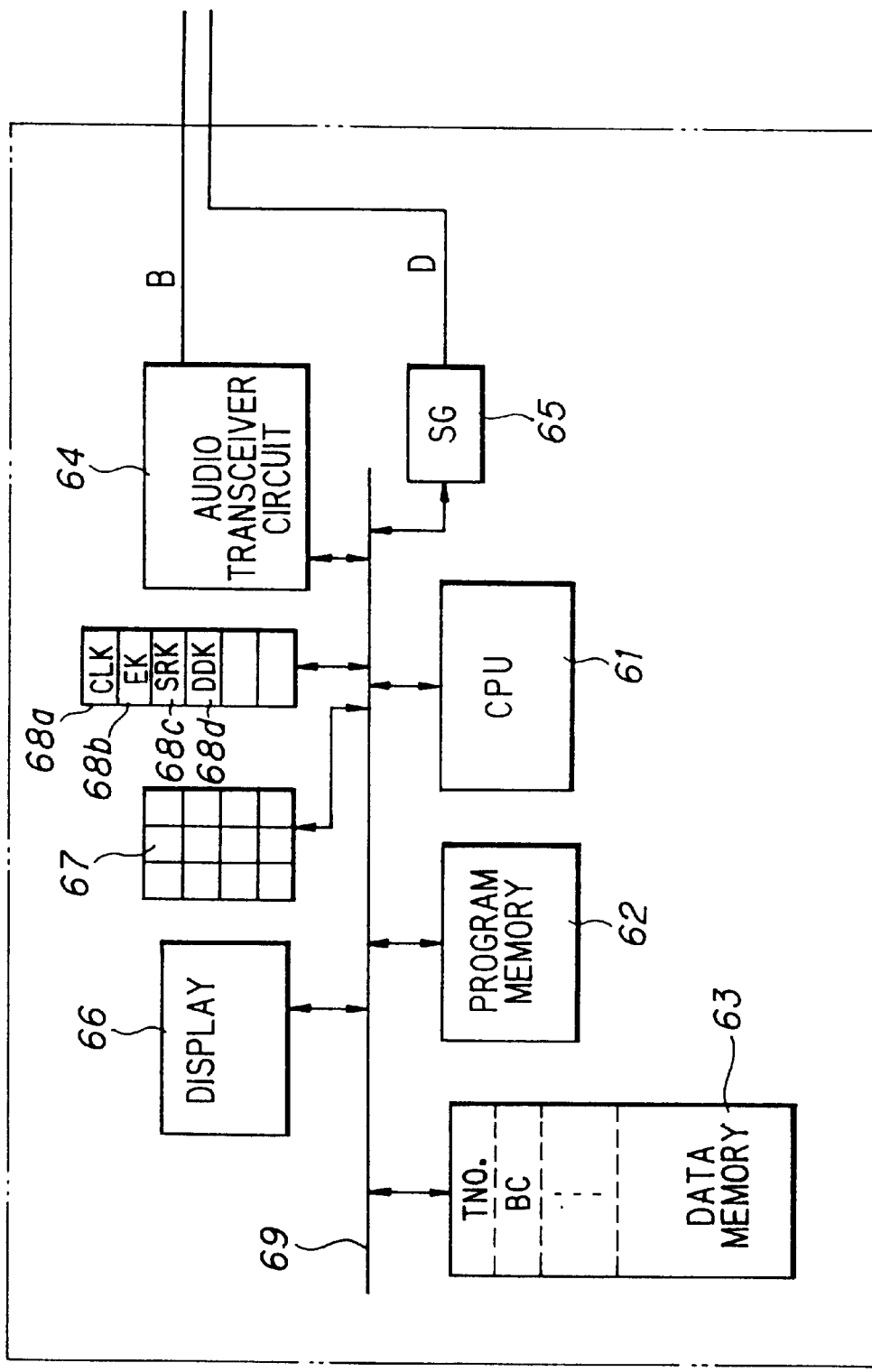
FIG. 4 is a block diagram illustrating an ISDN terminal.

FIG. 4 is a block diagram illustrating the construction of the ISDN terminals 13, 14. Each ISDN terminal includes a processor (CPU) 61 for performing overall control of the ISDN terminal, a program memory 62, a data memory 63, an audio transceiver circuit 64, a D-channel signal terminating circuit 65, a display unit 66, a numeric key pad 67, and a function key unit 68 for entering various data. These units are interconnected via a bus line 69. Various data is stored in prescribed storage areas of the data memory 63. This data includes a subscriber's number TNO transmitted by being placed in a SET-UP message (call set-up request message) at the time of call control, bearer capability BC, etc. The audio transceiver circuit 64 is provided with a handset, an audio controller for conversion between analog signals (audio, etc.) and digital data, and an interface controller, although these units are not illustrated. The function key unit 68 is provided with a call key (CLK) 68a, an end key (EK) 68b, a service registration key (SRK) 68c for setting whether or not a subscriber is to receive an incoming-call information service, and a disclosure designating key (DDK) 68d for designating whether inclusion of subscriber information in an incoming-call logging list is to be permitted or prohibited.

(b-4) Service Provision Center

Figure 5:
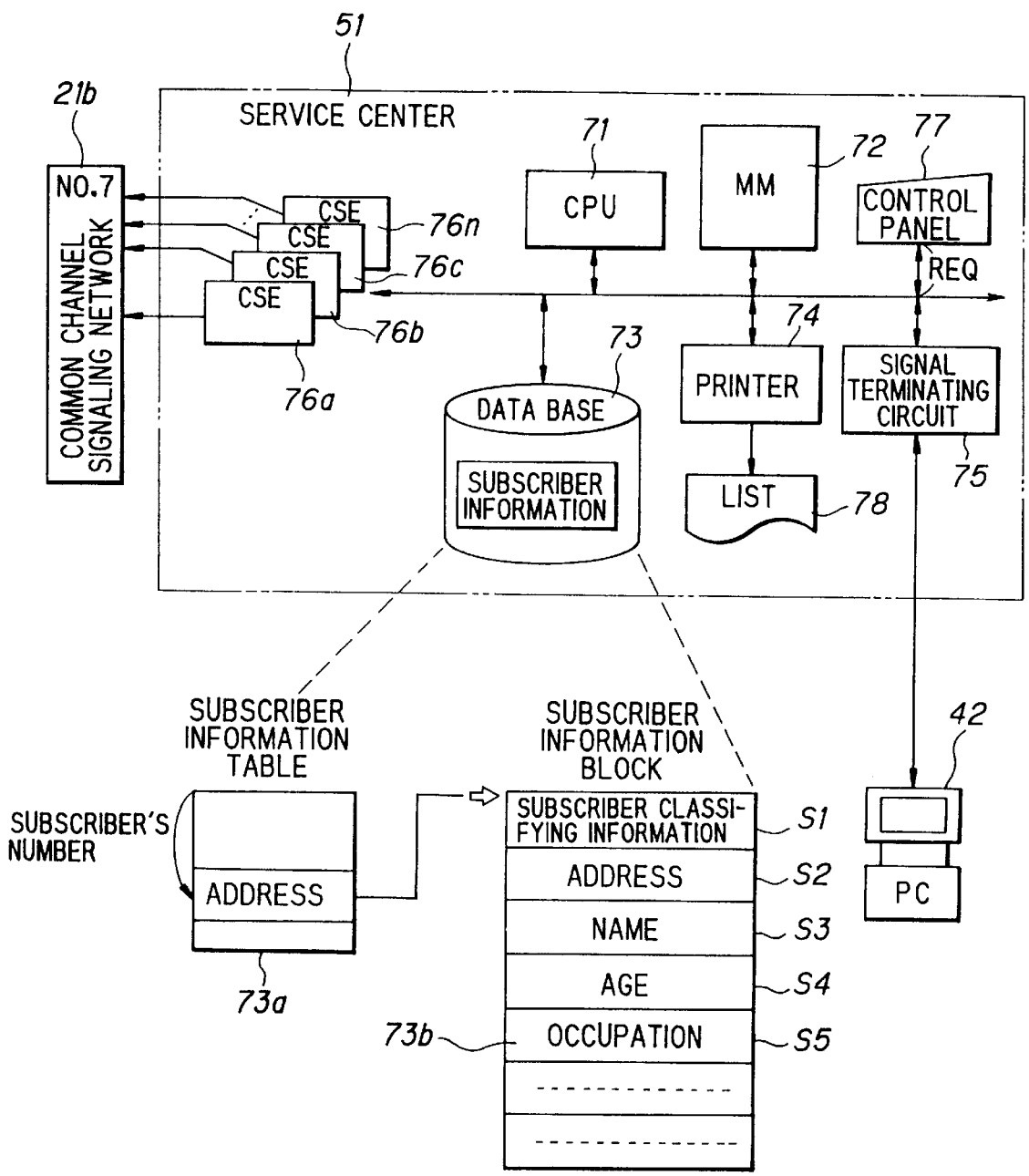
FIG. 5 is a block diagram illustrating the configuration of a service providing center.

FIG. 5 is a block diagram of the service providing center 51. The center 51 includes processor (CPU) 71 for executing incoming-call information provision processing and billing processing, memory 72 for storing incoming-call information and billing information, data base 73 for storing subscriber information (secondary data), printer 74 for printing out an incoming-call logging list for each user, a signal terminating circuit 75 connected to the personal computer via the communication network, common channel signaling equipment (CSE) 76a~76n for sending and receiving common channel signals to and from the No. 7 common channel signaling network and a control panel 77. Numeral 78 denotes the incoming-call logging list, which is printed out by printer 74. The data base 73 is provided with a subscriber information table 73a and a subscriber information block 73b. Subscriber classification (legal person or individual) S1, address S2, name S3, age S4 and occupation S5 are registered, on a subscriber-by-subscriber basis, in the subscriber information block 73b. The correlation between subscriber numbers and addresses at which subscriber information is stored is registered in the subscriber information table 73a.

Outgoing-call basic data or incoming-call basic data is transferred from each local switch (local exchange) via the No. 7 common channel signaling network 21b. The processor 71 accepts this data via the common channel signaling equipment 76a~76n and executes billing processing and incoming-call information provision processing. By way of example, when the incoming-call basic data 90 shown in FIG. 3C is sent from a local switch, processor 71 goes to data base 73 to retrieve subscriber information conforming to the originating subscriber's number A2 contained in this incoming-call basic data, combines this subscriber information with the incoming-call basic data 90, thereby creating incoming-call information shown in FIG. 6, and accumulates this information in memory 72. In response to an output request, processor 71 edits and outputs an incoming-call logging list for each user based upon the incoming-call information.

(b-5) Call Control Procedure

Figure 7:
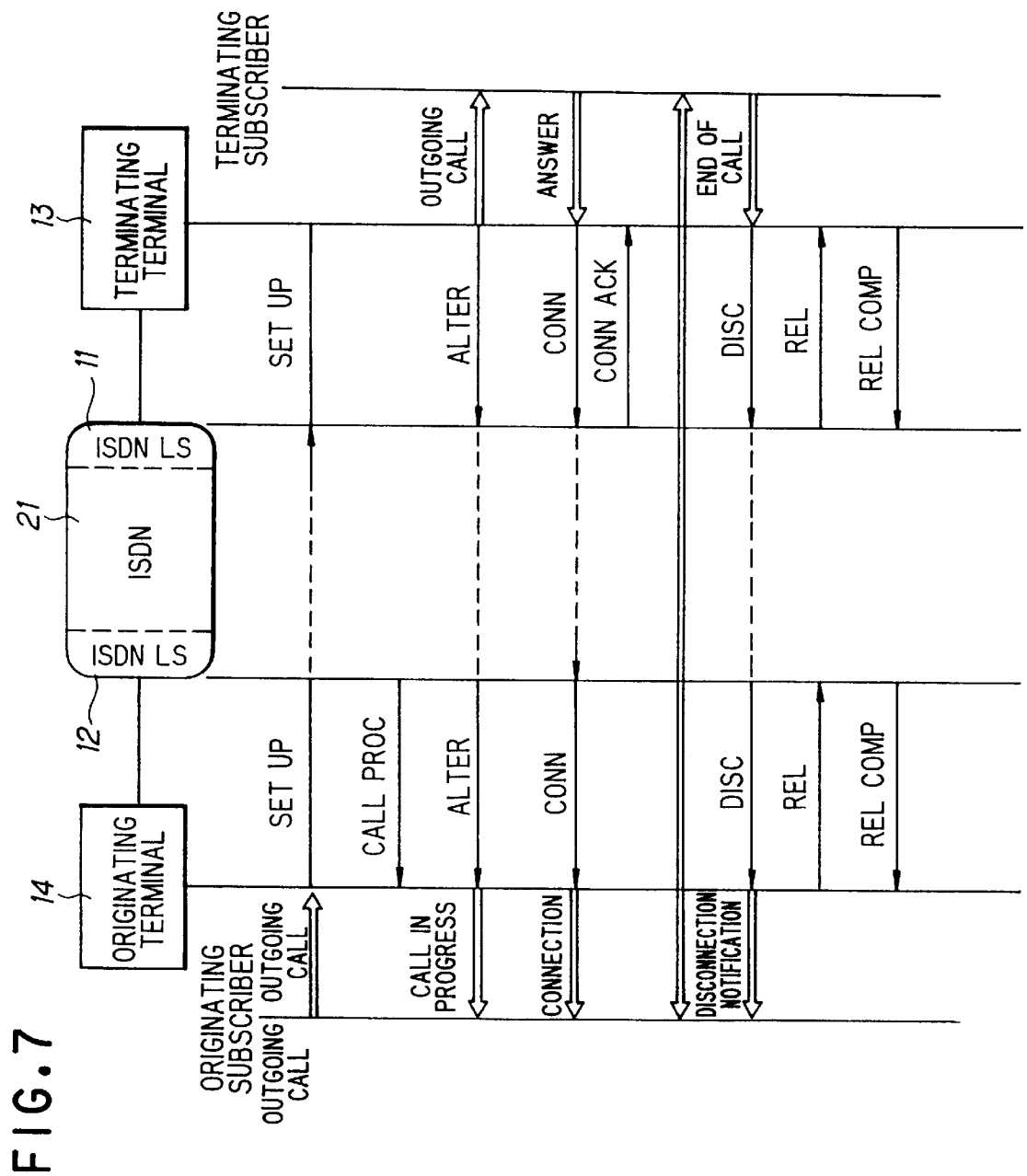
FIG. 7 is a diagram showing the call control procedure of an ISDN.

FIG. 7 is a diagram showing the ISDN call control procedure. When the telephone number of the ISDN terminal 13 is entered from the ISDN terminal 14 to place an outgoing call, a link is set up between the ISDN terminal 14 and the ISDN terminal 13. In response to completion of the link set-up, the originating terminal 14 sends a SET-UP message (call set-up request message) to the ISDN. The ISDN terminal sends a CALL PROC message (notification that processing is in progress for call set-up) to the originating terminal 14 and sends the SET-UP message to the terminating terminal 13. If the call set-up processing ends, the terminating terminal 13 issues a ringing tone and sends an ALERT message (called-party call notification) to the originating terminal 14 via the ISDN. Thereafter, if the terminating party picks up the receiver and answers (takes the phone off the hook), the terminating terminal 13 sends a CONN message (answer notification) to the ISDN. As a result, the ISDN sends a CONN ACK message (acknowledgment notification) to the terminating terminal 13 and sends the CC)NN message to the originating terminal 14. By virtue of this operation, the B-channels of the two terminals are connected to make communication possible.

If the call ends and the receiver of the terminating terminal 13 is hung up, for example, the terminating terminal outputs a DISC message (disconnect request) to the ISDN. The ISDN sends the DISC message to the originating terminal 14, disconnects the channel, releases a call reference and sends a REL message (completion of channel disconnection and call reference release request) to the terminating terminal 13. The latter releases the call reference in response to receipt of the REL message and sends a REL COMP message (notification of channel release and completion of call reference release) to the ISDN. Upon receiving the DISC message, the originating terminal 14 releases the call reference and sends the REL message to the ISDN. In response to receipt of the REL message, the ISDN releases the channel and the call reference and transmits the REL COMP message to the originating terminal 14, thereby ending the call control.

(b-6) SET-UP Message

The SET-UP message is for transferring information such as various numbers and the desired form of communication in order to start communication. The message has the constitution shown in FIG. 8. More specifically, the SET-UP message is broadly classified into a common portion ① and an individual portion ②. The common portion ① includes a protocol discriminator PD, an octet length CRL of EL call reference, a call reference CR, a SET-UP message type TYP, etc. The individual portion ② includes various information. The various information is composed of an information-element identifier IID, octet length LG of the content of the information element and information-element content ICT. Five information elements are included in FIG. 8, namely (1) bearer capability information (switching mode, information transfer capability, information transfer rate), (2) channel-in-use information, (3) number of originating party (originating subscriber's number), (4) number of terminating party (terminating subscriber's number) and (5) incoming-call logging information identification.

Figure 9:
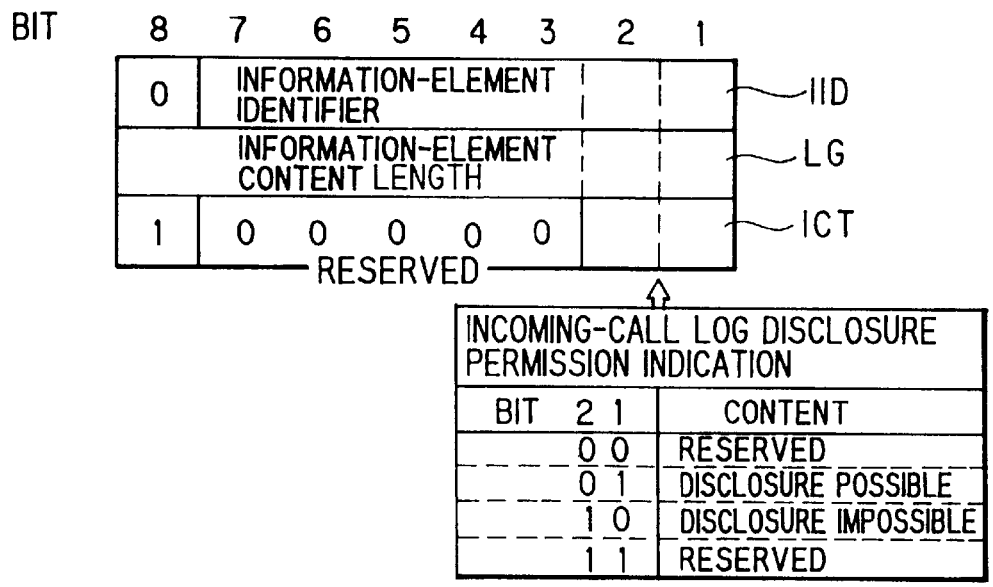
FIG. 9 is a diagram showing the elements of incoming-call logging information.

FIG. 9 is a diagram showing an incoming-call logging information element. This element is composed of the information-element identifier IID, the information-element content length (octet length) LG and information-element content ICT. First and second bits of the information-element content ICT are areas in which an indication as to whether the disclosure of originating subscriber information is to be permitted or prohibited is entered. Third through seventh bits are reserved areas (usually "0"s) set aside in order to indicate other types of information in the future. When the first and second bits are "10", this signifies that the disclosure is impossible (prohibited) and prohibits the inclusion of originating subscriber information in an incoming-call logging list. When the first and second bits are "01", this signifies that the disclosure is possible (permitted) and allows the inclusion of originating subscriber information in an incoming-call logging list. When the first and second bits are "00" or "11", this means that they have been set aside in order to indicate a different disclosure status in the future. For example, if the first and second bits are "11", this permits disclosure only of the telephone number of the originating subscriber but prohibits the disclosure of secondary data such as the name and address of the subscriber.

Thus, incoming-call logging information that includes an originating subscriber's number, terminating subscriber's number and an indication of whether the disclosure is permitted or prohibited can be transferred from an originating terminal to a terminating side by a SET-UP message in an ISDN.

(b-7) Overall Operation (1) Processing for creating incoming-call basic data

A subscriber operates the service registration key (SRK) 68c (FIG. 4) of the ISDN terminal 13 to set data in the ISDN exchange 11 indicating whether or not the incoming-call information service is to be received. For example, when the service registration key 68c is pressed in a state in which the subscriber has not subscribed to the service, an exchange of data is performed between the ISDN terminal 13 and the ISDN exchange 11 in accordance with a service registration procedure and an indication to the effect that the service has been subscribed to is entered in the subscriber data section (FIG. 3A) of the main memory 35.

Figure 8:
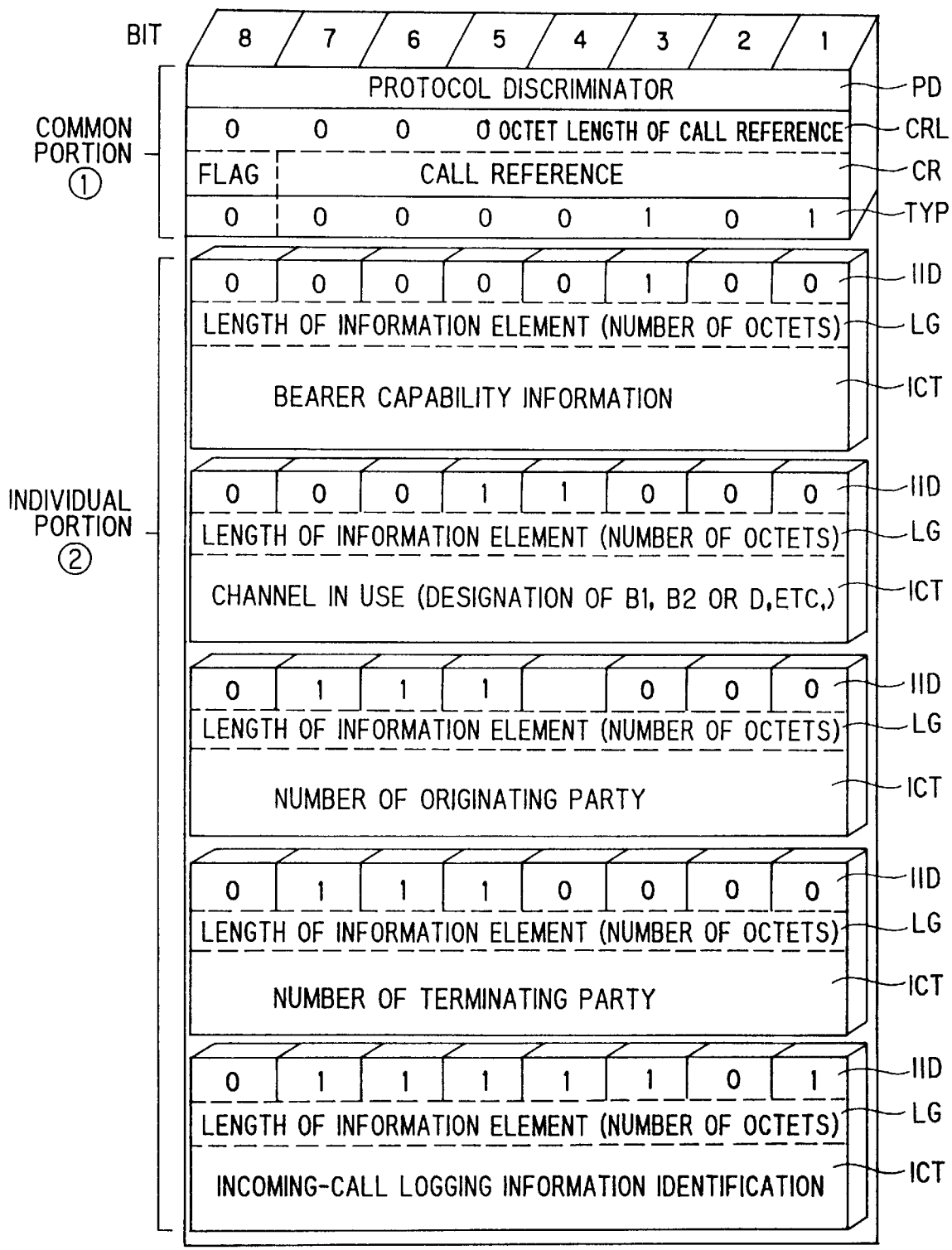
FIG. 8 is a diagram illustrating SET-UP messages.
Figure 10:
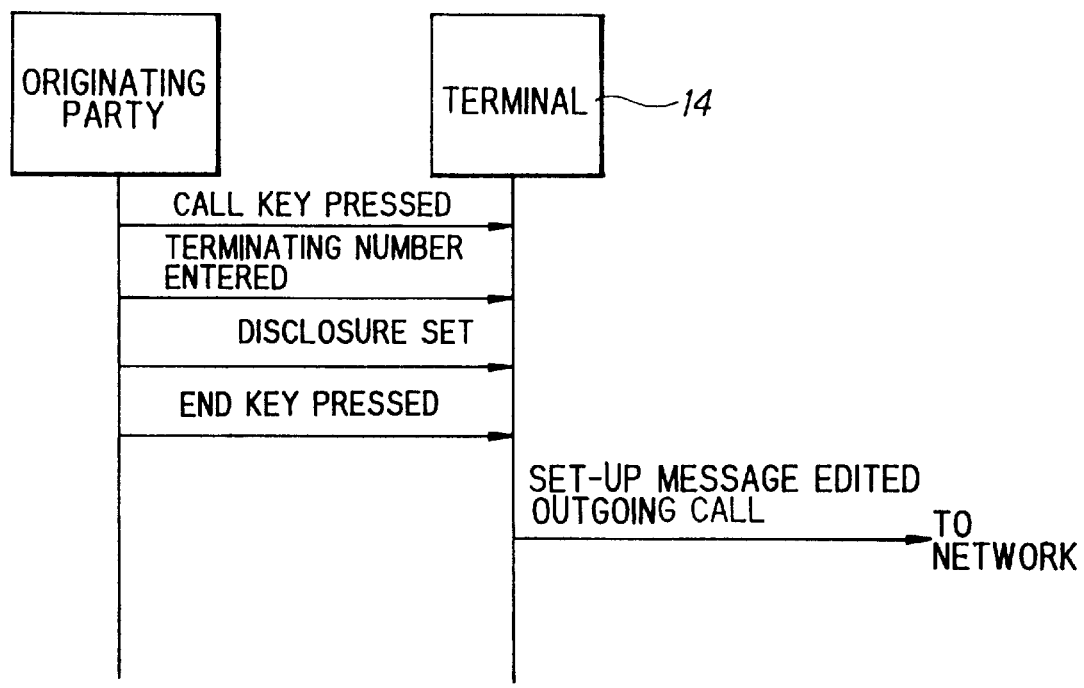
FIG. 10 is a diagram illustrating an outgoing-call operating procedure.

If the subscriber places an outgoing call under these conditions by entering the terminating number of the terminating terminal 13 from the originating terminal 14, the latter transmits the SET-UP message (see FIG. 8). FIG. 10 is a diagram of the procedure of the operation for placing an outgoing call from the ISDN terminal 14 on the originating side. When an outgoing call is made, the originating party presses the call key 68a, then enters the terminating number, uses the disclosure designating key 68d to enter whether disclosure of originating subscriber information is to be permitted or prohibited and finally presses the end key 68b. As a result, the originating terminal 14 transmits the SET-UP message after a link is established. It should be noted that the indication as to whether disclosure of originating subscriber information is to be permitted or prohibited can be set in the data memory 63 (FIG. 4) in advance so that the disclosure designating key 68d need not be operated each time an outgoing call is made. In such case, a change can be made from the permit state to the prohibit state or from the prohibit state to the permit state whenever the disclosure designating key 68d is operated.

Figure 11:
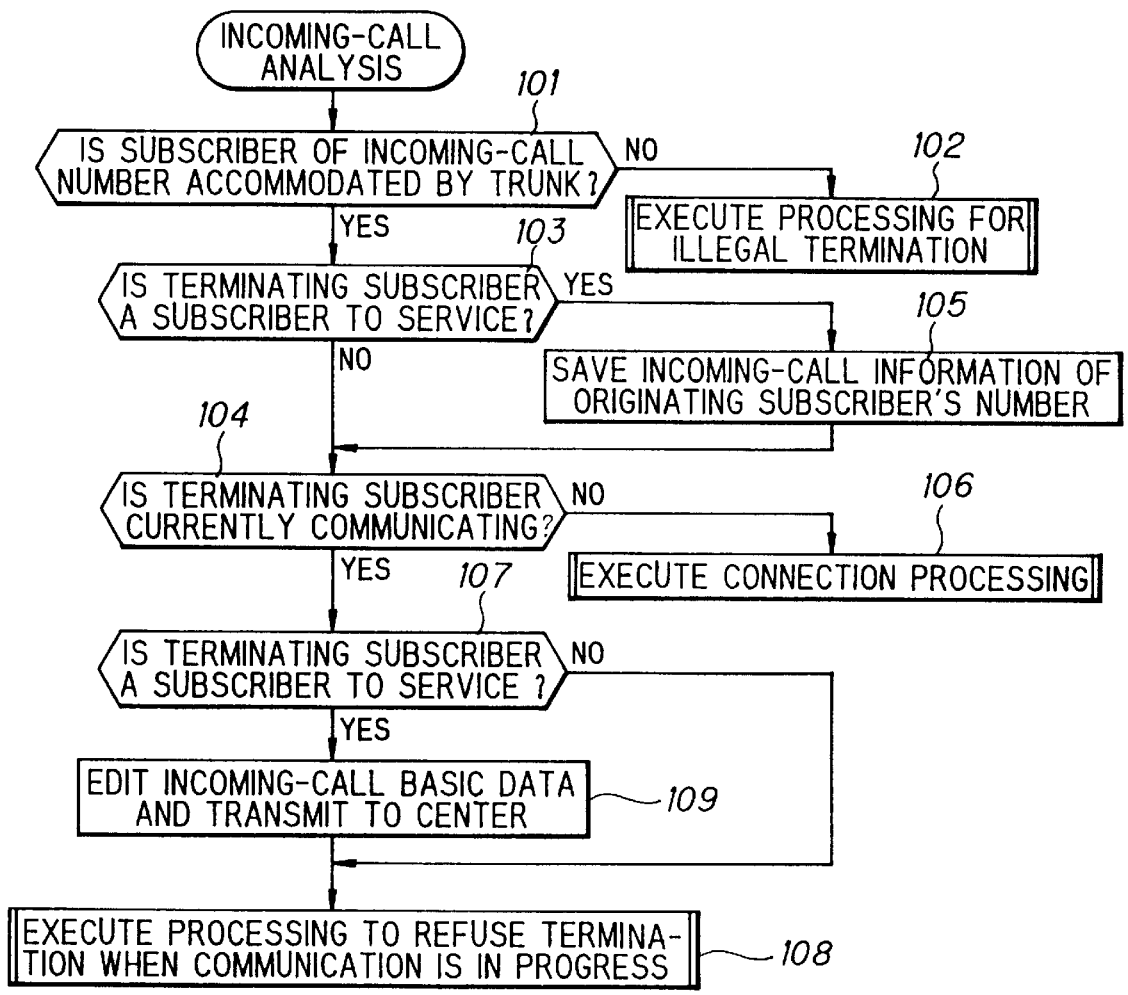
FIG. 11 is a flowchart (part 1) of termination processing.
Figure 12:
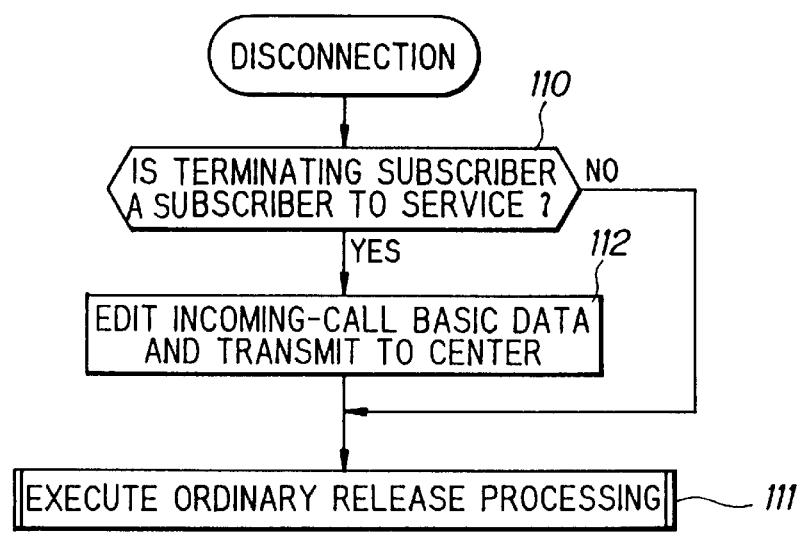
FIG. 12 is a flowchart (part 2) of termination processing.

The various information contained in the SET-UP message sent from the originating terminal 14 is transmitted to the ISDN exchange 11 on the terminating side via the ISDN exchange 12 on the originating side and the No. 7 common channel signaling network 21b. When there is an incoming call, the central processing unit 34 of the ISDN exchange 11 on the terminating side executes the termination processing illustrated in FIGS. 11 and 12.

Specifically, the central processing unit 34 refers to the terminating number and determines (step 101) whether this terminating number is the number of a terminal accommodated by its own exchange. If the terminating number is not the number of a terminal accommodated by its own exchange, then the central processing unit executes processing for illegal termination (step 102).

If the terminating number is the number of a terminal accommodated by its own exchange, then the central processing unit refers to the subscriber data (FIG. 3A) of the terminating subscriber to investigate whether the terminating subscriber subscribes to the incoming-call information provision information (step 103).

If the terminating subscriber does not subscribes to the incoming-call information service, then it is determined whether the terminating subscriber is communicating (step 104). If the terminating subscriber subscribes to the incoming-call information service, then the originating subscriber's number, the terminating subscriber's number and whether the disclosure of the originating subscriber information is permitted or prohibited (an indication permitting disclosure) are saved (step 105). Next, it is determined whether the terminating subscriber is communicating (step 104).

Figure 6:
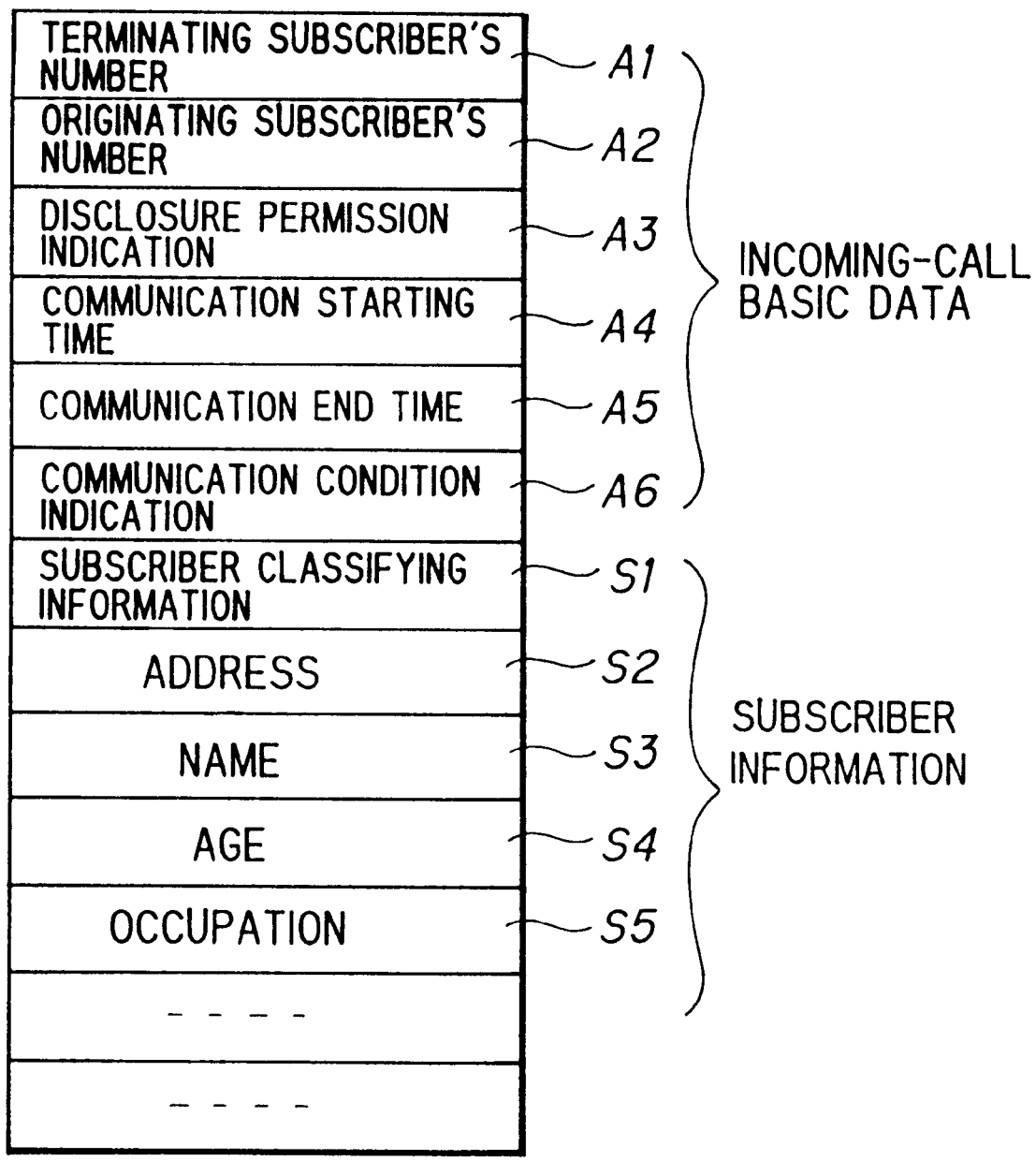
FIG. 6 is a diagram showing incoming-call information.

If the terminating subscriber is not communicating, then connection processing is executed (step 106). If the terminating subscriber is communicating, however, it is determined whether the terminating subscriber is subscribing to the incoming-call information service (step 107). If the terminating subscriber does not subscribe to the incoming-call information service, then processing for refusing termination while communication is in progress is executed and termination processing is ended (step 108). If the terminating subscriber subscribes to the incoming-call information service, however, then the incoming-call basic data 90 shown in FIG. 3C is created and sent to the service providing center 51 (step 109), after which the processing for refusing termination while communication is in progress is executed and termination processing is ended (step 108). In this case, it should be noted that the communication time (termination time) is entered in the incoming-call basic data 90 as the communication starting time A4 (FIG. 6), and the communication end time is made blank. Further, "communication in progress" is entered as the communication condition indication A6 (FIG. 6).

When there is no answer from the terminating party in the connection processing (step S106) or when the disconnected state is attained as the result of ending of the call after communication, the central processing unit 34 determines whether the terminating subscriber subscribes to the incoming-call information service (step 110).

If the terminating subscriber does not subscribe to the incoming-call information service, ordinary release processing is executed and termination processing is ended (step 111). If the terminating subscriber subscribes to the incoming-call information service, however, the incoming-call basic data 90 shown in FIG. 3C is created and sent to the service providing center 51 (step 112), after which ordinary release processing is executed and termination processing is ended (step 111). In this case, "normal end" is entered as the communication condition indication A6 in the incoming-call basic data 90 if the line is disconnected after communication (i.e., if the call is completed). The terminating time is entered as the communication starting time A4 if the line is disconnected because of no answer from the terminating party (i.e., if the call is not completed). In such case, the communication end time is left blank and "no answer" is entered as the communication condition indication A6.

(2) Incoming-call basic data communication procedure

Figure 13:
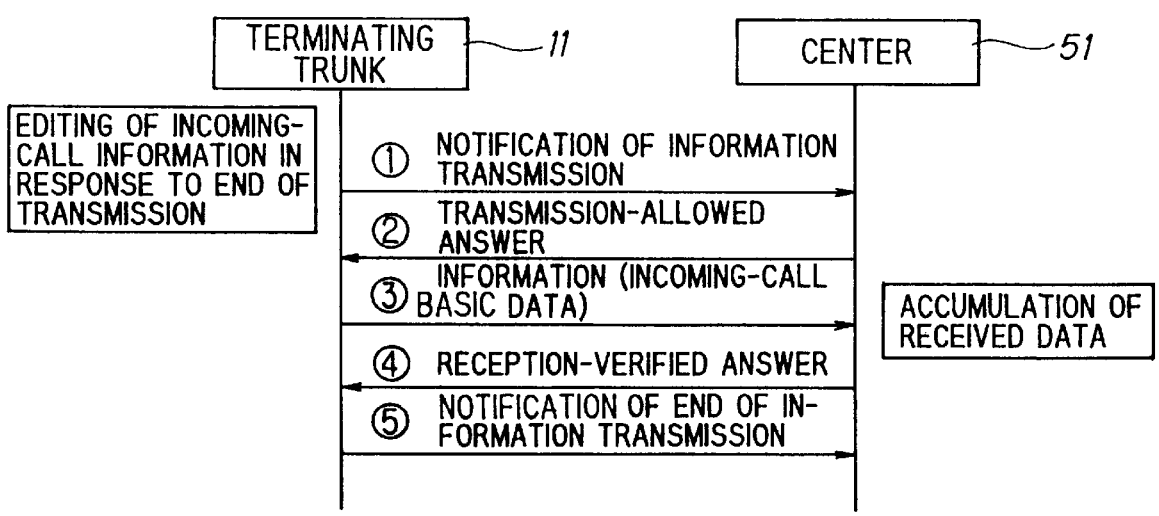
FIG. 13 is a diagram illustrating the procedure of communication between a terminating exchange and a center.

FIG. 13 is a diagram showing the procedure of communication between a terminating exchange and the center. In accordance with this processing, the incoming-call basic data is transmitted to the service providing center 51. In a case where the ISDN exchange 11 on the terminating side transmits incoming-call basic data to the service providing center 51 at steps 109, 112, this is performed in accordance with the following procedure: ① Notification of transmission of information is sent to the center 51 via the No. 7 common channel signaling network 21b. ② If the service providing center 51 is in a state in which it is capable of receiving information (incoming-call basic data), then the center 51 sends an answer to the effect that transmission is allowed back to the ISDN exchange 11. ③ In response to receipt of the answer to the effect that transmission is allowed, the ISDN exchange 11 transmits the information (incoming-call basic data) to the service providing center 51. ④ As a result, the service providing center 51 stores the received data and sends an answer to the effect that reception has been verified back to the ISDN exchange. ⑤ The ISDN exchange 11 sends notification of the end of information transmission to the center 51 and ends communication.

The foregoing deals with a case in which the terminating exchange transmits incoming-call basic data to the service providing center 51 item by item. However, the incoming-call basic data can be accumulated by the terminating exchange and transmitted to the service providing center 51 en masse.

(3) Processing for creating incoming-call information

Figure 14:
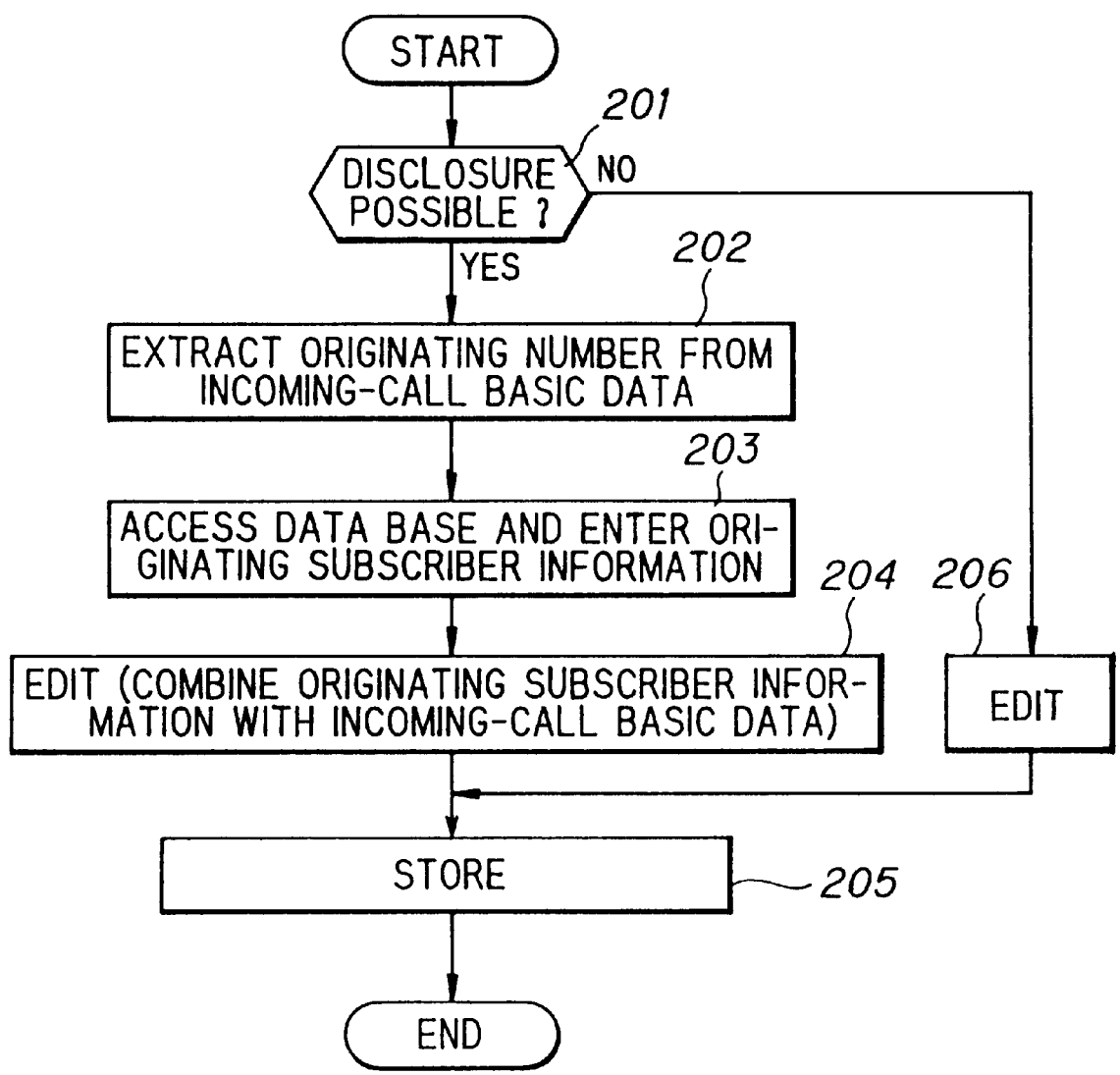
FIG. 14 is a flowchart of processing executed when incoming-call basic data is received.

FIG. 14 is a flowchart of processing executed by the service providing center 51 when incoming-call basic data 90 is received. When the incoming-call basic data 90 is received via the No. 7 common channel signaling network 21b and the common channel signaling equipment 76a~76n, the controller 71 of the service providing center 51 (FIG. 5) refers to the disclosure permission indication A3, which is contained in the incoming-call basic data, to determine whether disclosure of the originating subscriber information is permitted or prohibited (step 201). If the disclosure of the originating subscriber information is permitted, the originating subscriber's number A2 is extracted from the incoming-call basic data 90 (step 202), the data base 73 is accessed based upon the originating subscriber's number and subscriber information (subscriber classification, address, name, age and occupation) of the originating subscriber are obtained (step 203). Next, the originating subscriber information is combined with the incoming-call basic data to create incoming-call information (see FIG. 6) (step 204), the incoming-call information is stored in the memory 72 and processing is ended (step 205).

If the disclosure of the originating subscriber information is found to be prohibited at step 201, on the other hand, then editing is performed (step 206) to remove the originating subscriber's number from the incoming-call basic data and the resulting incoming-call information is stored in the memory 72 (step 205). It should be noted that an arrangement may be adopted in which the originating subscriber's number is incorporated in the incoming-call information even if the disclosure of the originating subscriber information is prohibited. It will be assumed below that the originating subscriber's number has been incorporated in the incoming-call information.

(4) Processing for outputting incoming-call logging list

Figure 15:
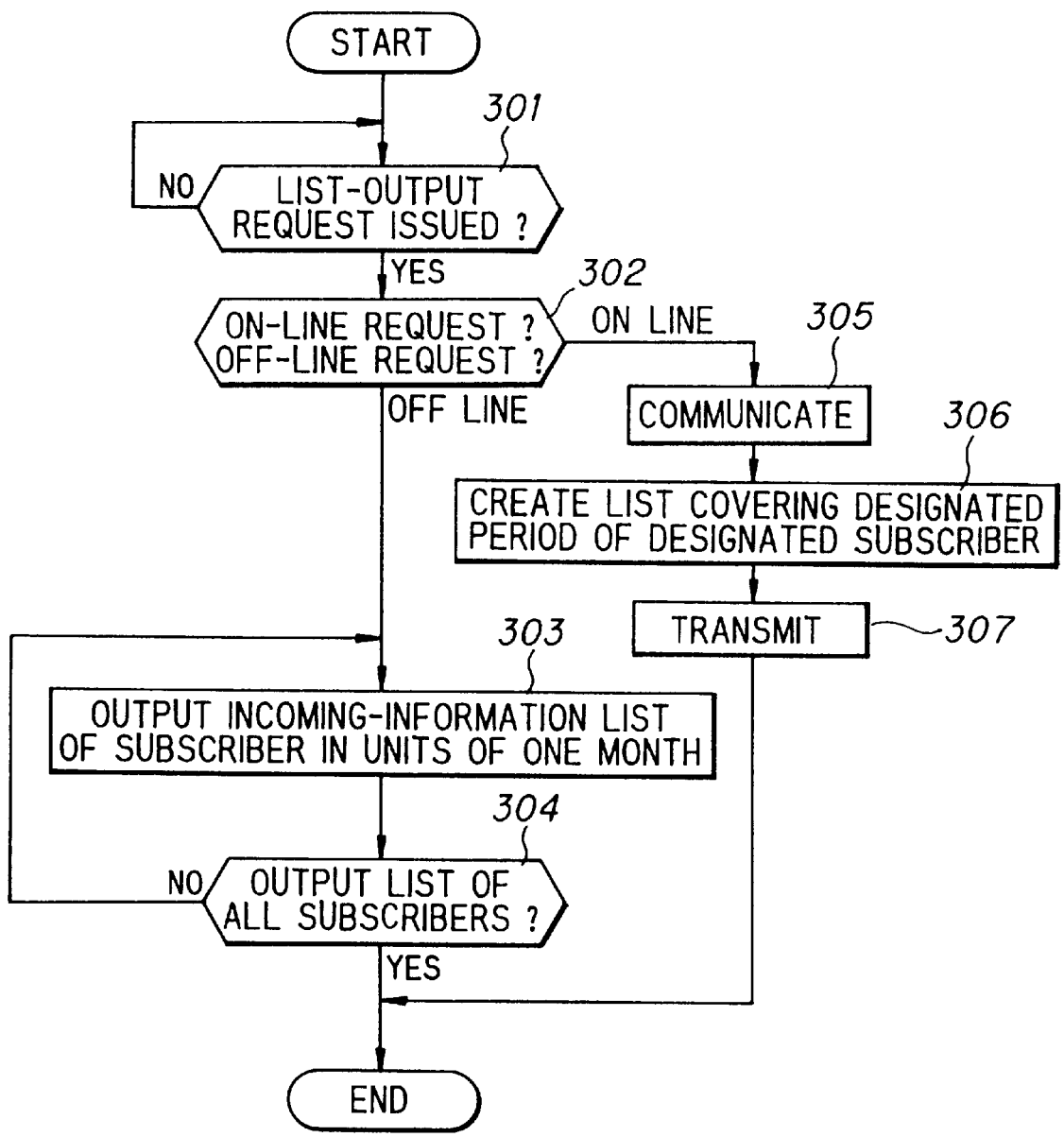
FIG. 15 is a flowchart of processing executed when a list is outputted.

FIG. 15 is a flowchart of processing executed by the service provision center 51 to output the incoming-call logging list. The controller 71 performs monitoring (step 301) to determine whether a request for outputting the incoming-call logging list has been received from the control panel or from an external unit. If an output has been requested, it is determined (step 302) whether this request is a periodic output request (an off-line output request REQ from the control panel) or an on-line request from an external personal computer.

If the request is the off-line request, then the incoming-call logging list of the subscriber is edited for every subscriber in fixed-interval units (e.g., units of one month) and the edited list is printed out by the printer 74 (step 303). FIG. 16 illustrates an example of the output format of the incoming-call logging list 78. This list includes a section 78a indicating the name of the subscriber and the subscriber's number, a section 78b indicating the period of the incoming-call log, and a section 78c indicating the incoming-call log. Incoming-call information 78c-1, 78c-2, . . . 78c-m is printed, call by call, in the incoming-call log section 78c. In the case where the disclosure of the originating subscriber information is permitted, the printed information includes consecutive numbers, originating subscriber's numbers, an indication of whether the disclosure is permitted, communication starting times, communication end times, communication conditions and originating subscriber's names, addresses and occupations. In the case where the disclosure of the originating subscriber information is prohibited, the printed information includes consecutive numbers, originating subscriber's numbers, an indication of whether the disclosure is permitted, communication starting times, communication end times and communication conditions.

Whenever an incoming-call logging list of a subscriber is outputted, it is determined (step 304) whether a list of all subscribers is to be outputted. The processing of step 303 is repeated until a list is outputted with regard to all subscribers.

If it is determined at step 302 that the request is an on-line output request, then the subscriber's number and the period of the incoming-call log are received from the external personal computer 42 in accordance with a prescribed communication procedure (step 305). Next, a list covering the designated period is created from the incoming-call information of the subscriber (step 306), the list is transferred to the external personal computer 42 and the output processing is ended (step 307).

(5) On-line Access Procedure

Figure 17:
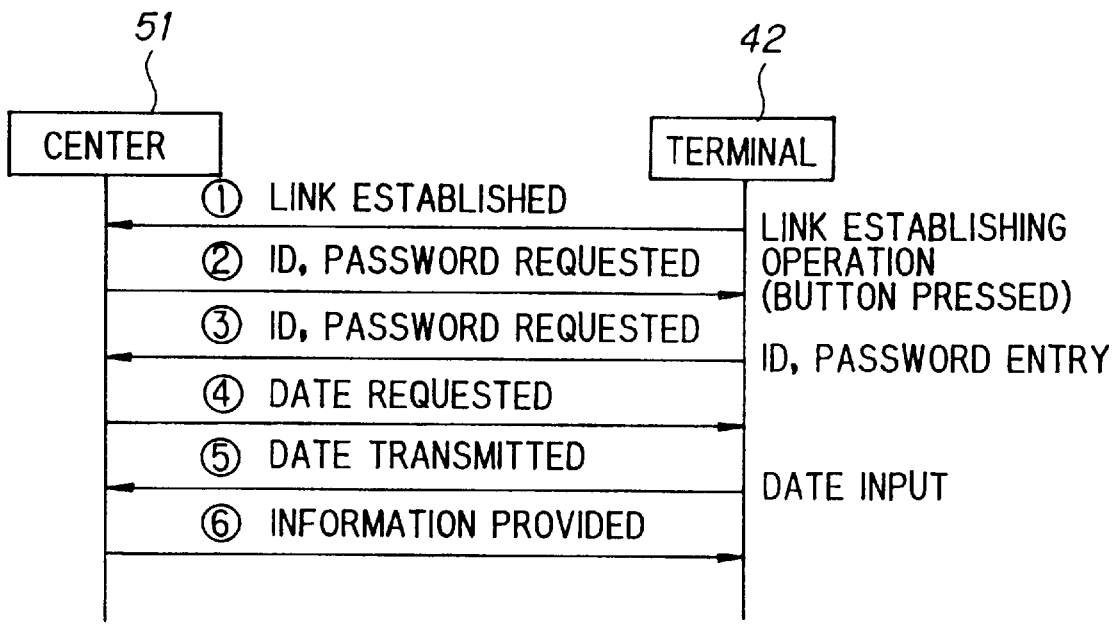
FIG. 17 is a diagram illustrating an on-line access procedure.

FIG. 17 is a diagram of the on-line access procedure. ① In a case where there is an on-line request for an incoming-call log from the personal computer 42, which serves as an on-line terminal, the number of the service providing center 51 is entered from the terminal 42 to establish a link. As a result, ② the controller 71 of the service providing center 51 requests the terminal 42 for the ID (subscriber's number) and a password. ③ The terminal 42 displays the request on a display unit and, if the subscriber enters the ID and the password, it transmits the entered ID and password to the service providing center 51. ④ If the controller 71 receives the ID and password from the terminal 42, then it checks to see whether the password is correct. If the password is correct, the controller 71 requests the terminal for the date of the incoming-call information desired. ⑤ The terminal 42 displays this request on the display unit and, if the subscriber enters the date, it transmits the entered date to the controller 71. ⑥ The controller 71 then creates the list covering the designated date from the incoming-call information of the designated subscriber and transfers the list to the terminal 42. It should be noted that a certain period of time can be entered instead of the date.

(c) Modification

Figure 18:
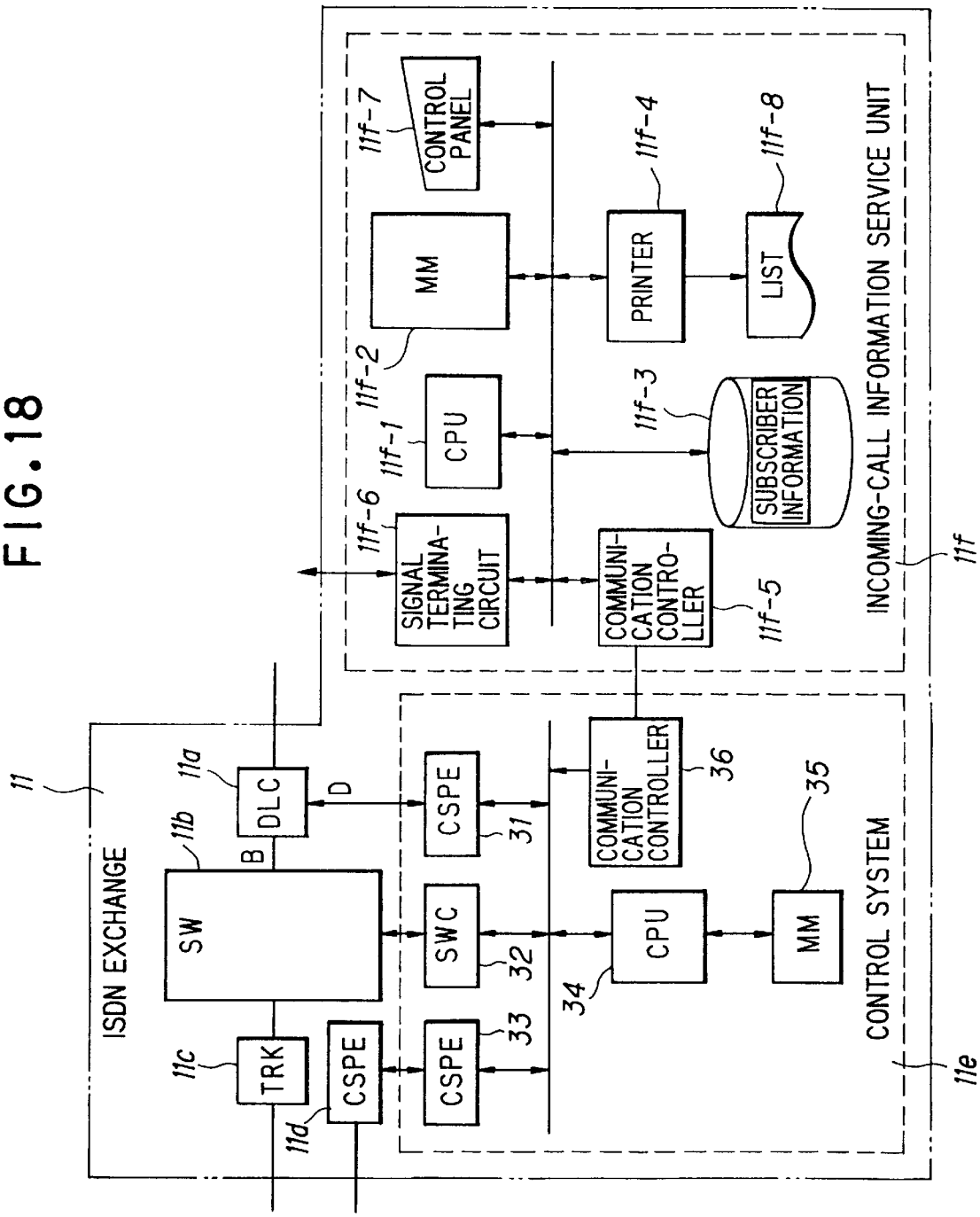
FIG. 18 is a block diagram illustrating an exchange system in a case where a List is outputted by a terminating exchange.

In the case described above, incoming-call basic data 90 is transmitted to the service providing center 51 and an incoming-call logging list is created and outputted by the service providing center. However, an arrangement can be adopted in which the incoming-call logging list is created and outputted by a terminating exchange. FIG. 18 is a block diagram illustrating an ISDN exchange 11 in such a case. Elements identical with those of the second embodiment shown in FIG. 2 are designated by like reference numerals. Numeral 11f denotes an incoming-call information service unit, and numeral 36 represents a communication controller, which is provided in the control system 11e, for exchanging data with the incoming-call information service unit. The incoming-call information service unit 11f has a construction substantially the same as that of the service provision center 51 of FIG. 5 and includes a processor (CPU) 11f-1 for executing incoming-call information supply processing, a memory 11f-2 for storing incoming-call information, a data base 11f-3 for storing subscriber information, a printer 11f-4 for outputting an incoming-call logging list for each and every user, a communication controller 11f-5 for performing data communication with the side of the control system, a signal terminating circuit 11f-6 connected to an external on-line terminal via a communication line, and a control panel 11f-7. The data base 11f-3 stores subscriber information identical with that of the data base 73 of FIG. 5. The data base 11f-3 can be provided in an external communication center or the like so that it may be shared by each local switch.

The incoming-call basic data 90 is transferred to the incoming-call information service unit 11f from the control system 11e. The processor 11f-1 accepts the incoming-call basic data and executes incoming-call information service processing similar to that of the flowchart shown in FIG. 14. For example, when the incoming-call basic data 90 is sent from the control system 11e, subscriber information conforming to the originating subscriber's number contained in the incoming-call basic data is retrieved from the data base 11f-3, this subscriber information is combined with the incoming-call basic data to create incoming-call information, and this information is accumulated in the memory 11f-2. Further, the processor 11f-1 executes list output processing similar to that of the flowchart of FIG. 15 when there is a request for output of the list. That is, depending upon whether the request is an off-line output request or an on-line output request, an incoming-call logging list 11f-8 is edited and outputted user-by-user based upon the incoming-call information that has been stored in the memory 11f-2.

In the foregoing, disclosure permit/prohibit data regarding subscriber information is transmitted from the originating terminal to the terminating terminal. However, an arrangement can be adopted in which this data is not transmitted. Rather, the subscriber's number or subscriber information can be combined with the incoming-call information and printed out at all incoming calls.

In the foregoing, the name, address, age and occupation of a subscriber are registered in a data base and this subscriber information is combined with the incoming-call information and outputted. However, more detailed subscriber information can be combined with the incoming-call information and outputted. For example, an arrangement can be adopted in which a data base installed at a bank or the like is accessed from the service providing center 51, wherein the amount in a customer's account, the amount of loans and the customer's credit rating can be obtained from the data base and outputted by printed in the incoming-call logging list. If this arrangement is adopted, a more useful customer list can be obtained from the incoming-call logging list.

Though the present invention has been described with regard to a case in which it is applied to an ISDN, the invention is not limited to an ISDN but can be applied to networks capable of transmitting the originating subscriber's number.

In accordance with the present invention, a terminating exchange creates incoming-call basic data, which includes at least a terminating subscriber's number, an originating subscriber's number and communication time, whenever there is an incoming call, creates a requested incoming-call logging list for each user based upon the incoming-call basic data, and outputs the list. As a result, each user is capable of ascertaining the circumstances of all incoming calls terminated over a prescribed period of time. In addition, if communication conditions indicating the distinction among normal finish, termination during communication and no response by subscriber are combined with the incoming-call basic data, the user can ascertain more detailed incoming-call logging.

Furthermore, in accordance with the present invention, secondary data, which has at least the names and addresses of subscribers, is registered in a data base so as to correspond to subscriber's numbers, the secondary data conforming to an originating subscriber's number contained in the incoming-call basic data is retrieved from the data base, the secondary data is combined with the incoming-call basic data to create incoming-call information, and an incoming-call logging list is outputted for each user based upon the incoming-call information. As a result, highly sophisticated information such as the names and addresses of calling parties can be combined with the incoming-call information and provided to the user. This raises the utility value of the incoming-call information. By way of example, a customer list can readily be prepared from the list of incoming-call information.

Further, in accordance with the present invention, whether to permit or prohibit inclusion of subscriber information in an incoming-call logging list is indicated to the communication network from the originating terminal. The terminating exchange or a communication center refers to the permit/prohibit data and, if inclusion of the subscriber information is prohibited, refrains from including the subscriber information (telephone number, name, address, etc.) in the incoming-call logging list. As a result, a subscriber who does not wish his or her own telephone number, name and address, etc., to be disclosed by the incoming-call logging list is capable of readily prohibiting disclosure of this information.

Furthermore, in accordance with the present invention, whether or not a subscriber is to receive an incoming-call information service is set by the subscriber at a terminal and a network is notified of the setting. The network registers, in an internal memory, and in correspondence with the subscriber's number, whether the service is required or not. Thus, an incoming-call information service can be received with ease.

Further, in accordance with the present invention, the terminating exchange or communication center is so adapted as to output an incoming-call logging list and provide the list to a user on line when a request has been issued by the user and off line periodically. If this arrangement is adopted, a user can acquire an incoming-call logging list whenever necessary or periodically.

As many apparently widely different embodiments of the present invention can be made without departing from the spirit and scope thereof, it is to be understood that the invention is not limited to the specific embodiments thereof except as defined in the appended claims.

What is claimed is:

1. A communication service method in a communication network having a function for notifying a terminating side of an originating subscriber's number, comprising the steps of:

creating incoming-call basic data which includes at least an originating subscribers number and communication starting time, in correspondence with a terminating subscriber's number at a terminating exchange in the communication network whenever there is an incoming call to an accommodated subscriber;

holding the incoming-call basic data at the terminating exchange;

outputting from the terminating exchange, in response to a list-output request, an incoming-call logging list of a requesting subscriber on the basic of the incoming-call basic data;

indicating to the communication network, from an originating subscriber terminal, whether to permit or prohibit disclosure of information relating to an originating subscriber in said incoming-call logging list;

causing the communication network to transmit permit/prohibit data to the terminating exchange together with an originating subscriber's number; and in a case where disclosure of the information relating to the originating subscriber has been prohibited, outputting an incoming-call logging list devoid of said originating subscriber's number.

2. The method according to claim 1, wherein the terminating exchange sends the incoming-call basic data to a communication center, and the communication center holds the incoming-call basic data and outputs an incoming-call logging list in response to the list-output request.

3. The method according to claim 1, wherein communication conditions indicating distinction between finish of a call, termination during communication and no response by a subscriber are included in the incoming-call basic data.

4. The method according to claim 1, wherein the permit or prohibit data is included in the incoming-call basic data.

5. The method according to claim 1, further comprising the steps of:

setting, from a terminal, whether or not a subscriber is to receive an incoming-call information service, and informing the terminating exchange of the setting;

causing the terminating exchange to register, in correspondence with the subscriber's number, whether or not the service is required;

checking, in the terminating exchange, at the time of termination of an incoming call, whether the terminating subscriber requires the incoming-call information service; and creating incoming-call basic data only if the service is required.

6. The method according to claim 1, wherein when the list-output request is issued from a user terminal via a communication line, the incoming-call logging list of said user is provided on the line.

7. The method according to claim 1, wherein incoming-call basic data is accumulated over a fixed period of time and said incoming-call basic data over the fixed period of time is collectively outputted from the terminating exchange in the form of a list for each terminating subscriber in response to a list-output request.

8. A communication service method in a communication network having a function for notifying a terminating side of an originating subscriber's number, the method comprising the steps of:

registering secondary data, which has at least names and addresses of subscribers, in a data base in advance in correspondence with subscriber's numbers;

creating incoming-call basic data, which includes at least an originating subscribers number and communication starting time in correspondence with a terminology subscribers number at a terminating exchange in the communication network whenever there is an incoming call to an accommodated subscriber;

retrieving the secondary data conforming to the originating subscriber's number from the data base;

combining this secondary data with the incoming-call basic data to create incoming-call information in the terminating exchange, and holding the incoming-call information created;

outputting from the terminating exchange, in response to a list-output request, an incoming-call logging list of a requesting subscriber on the basis of the incoming-call information;

indicating to the communication network, from an originating subscriber terminal, whether to permit or prohibit disclosure of information relating to an originating subscriber in said incoming-call logging list;

causing the communication network to transmit permit/prohibit data to a terminating side together with an originating subscriber's number; and in a case where disclosure of the information relating to the originating subscriber has been prohibited, outputting an incoming-call logging list devoid of said originating subscriber's information.

9. The method according to claim 8, wherein the terminating exchange sends the incoming-call basic data to a communication center, and the communication center creates and holds incoming-call information and outputs an incoming-call logging list in response to the list-output request.

10. The method according to claim 8, wherein the permit or prohibit data is included in the incoming-call basic data.

11. The method according to claim 8, wherein when the list-output request is issued from a user terminal via a communication line, the incoming-call logging list of said user is provided on the line.

12. The method according to claim 8, wherein incoming-call information is accumulated over a fixed period of time and said incoming-call information over the fixed period of time is collectively outputted from the terminating exchange in the form of a list for each terminating subscriber in response to a list-output request.

13. An exchange in a communication network having a function for notifying a terminating side of an originating subscriber's number, comprising:

registering means for registering, in advance, a plurality of subscribers which are to receive provision of an incoming-call logging list;

incoming-call basic data creating means for creating incoming-call basic data which includes at least an originating subscriber's number and communication starting time in correspondence with a terminating subscriber's number, whenever there is an incoming call to an accommodated subscriber registered in said registering means;

output means for outputting an incoming-call logging list of a requesting subscriber on the basis of the incoming-call basic data in response to an output request; and means for receiving from an originating subscriber terminal, via the communication network, permit/prohibit data, which indicates whether to permit or prohibit disclosure of subscriber information in the incoming-call logging list, together with an originating subscriber's number; wherein said output means refrains from including the subscriber information in the incoming-call logging list in a case where disclosure of the subscriber information has been prohibited.

14. The exchange according to claim 13, wherein said incoming-call basic data creating means creates the incoming-call basic data which includes communication conditions indicating distinction between finish of a call, termination during communication and no response by a subscriber.

15. The system according to claim 13, wherein said incoming-call basic data creating means includes the permit or prohibit data in the incoming-call basic data.

16. The exchange according to claim 13, further comprising:

means for accumulating incoming-call basic data over a fixed period of time; wherein said output means collectively outputting said incoming-call basic data over the fixed period of time in the form of a list for each terminating subscriber in response to a list-output request.

17. An exchange in a communication network having a function for notifying a terminating side of an originating subscriber's number, comprising:

a data base for registering, in advance, secondary data, which has at least names and addresses of subscribers, in correspondence with subscriber's numbers;

registering means for registering, in advance, a plurality of subscribers which are to receive provision of an incoming-call logging list;

incoming-call basic data creating means for creating incoming-call basic data, which includes at least an originating subscriber's number and communication starting time in correspondence with a terminating subscriber's number, whenever there is an incoming call to an accommodated subscriber registered in said registering means;

retrieving means for retrieving the secondary data conforming to the originating subscriber's number from said data base;

means for combining this secondary data with the incoming-call basic data to create incoming-call information;

output mean for outputting an incoming-call logging list of a requesting subscriber on the basis of the incoming-call basic data in response to an output request; and means for receiving from an originating subscriber terminal, via the communication network, permit/prohibit data, which indicates whether to permit or prohibit disclosure of subscriber information in the incoming-call logging list, together with an originating subscriber's number; wherein said output means refrains from including the subscriber information in the incoming-call logging list in a case where disclosure of the subscriber information has been prohibited.

18. The exchange according to claim 17, wherein said incoming-call basic data creating means includes the permit or prohibit data in the incoming-call basic data.

19. The exchange system according to claim 17, further comprising:

means for accumulating incoming-call information over a fixed period of time; wherein said output means collectively outputting said incoming-call information over the fixed period of time in the form of a list for each terminating subscriber in response to a list-output request.

20. The exchange according to claim 13, wherein the terminating exchange sends the incoming-call basic data to a communication center, and the communication center holds the incoming-call basic data and outputs an incoming-call logging list in response to the output request.

21. The exchange according to claim 17, wherein the terminating exchange sends the incoming-call basic data to a communication center, and the communication center holds the incoming-call basic data and outputs an incoming-call logging list in response to the output request.

22. A communication service method in a communication network having a function for notifying a terminating side of an originating subscriber's number, the method comprising the steps of:

registering, in correspondence with a subscriber's number, whether or not an incoming-call information service is required at a terminating exchange in the communication network;

indicating to the communication network, from an originating subscriber terminal, whether to permit or prohibit disclosure of information relating to an originating subscriber;

causing the communication network to transmit, permit or prohibit data to the terminating exchange together with an originating subscriber's number;

checking, in the terminating exchange, at the time of termination of an incoming call, whether the terminating subscriber requires the incoming-call information service;

in a case where the terminating subscriber requires the service, creating incoming-call basic data, which includes a terminating subscriber's number, an originating subscriber's number, communication starting time, the permit or prohibit data and communication conditions indicating distinction between finish of a call, termination during communication and no response by the terminating subscriber, at the terminating exchange;

holding the incoming-call basic data at the terminating exchange;

monitoring whether a request for outputting an incoming-call logging list has been received;

if the request has been received, outputting from the terminating exchange, the incoming-call logging list of a requesting subscriber on the basis of the incoming-call basic data, wherein in a case where the disclosure of the information relating to the originating subscriber is prohibited, the terminating exchange outputs the incoming-call logging list devoid of said originating subscriber's number and in a case where the disclosure is permitted, the terminating exchange outputs the incoming-call logging list including said originating subscriber's number.

23. The method according to claim 22, further comprising steps of:

determining whether the disclosure of the information relating to the originating subscriber is prohibited or permitted by reference to said permit or prohibit data;

outputting the incoming-call logging list devoid of said originating subscribers number in a case where the disclosure is prohibited; and outputting the incoming-call logging list including said originating subscriber's number in a case where the disclosure is permitted.

24. A communication service method in a communication network having a function for notifying a terminating side of an originating subscriber's number, the method comprising the steps of:

registering, in correspondence with a subscriber's number, whether or not an incoming-call information service is required at a terminating exchange in the communication network;

registering secondary data, which has at least names and addresses of subscribers, in a data base provided in the terminating exchange in advance in correspondence with subscriber's numbers;

indicating to the communication network, from an originating subscriber terminal, whether to permit or prohibit disclosure of information relating to an originating subscriber;

causing the communication network to transmit, permit or prohibit data to the terminating exchange together with an originating subscriber's number;

checking, in the terminating exchange, at the time of termination of an incoming call, whether the terminating subscriber requires the incoming-call information service;

in a case where the terminating subscriber requires the service, creating incoming-call basic data, which includes a terminating subscriber's number, an originating subscriber's number, communication starting time, the permit or prohibit data and communication conditions indicating distinction between finish of a call, termination during communication and no response by the terminating subscriber, at the terminating exchange;

determining whether the disclosure of the information relating to the originating subscriber is prohibited or permitted by reference to said permit or prohibit data;

in a case where the disclosure is permitted, retrieving the secondary data conforming to the originating subscriber's number from the data base, combining the secondary data with the incoming-call basic data to create incoming-call information in the terminating exchange, and holding the incoming-call information;

in a case where the disclosure is prohibited, editing incoming-call information devoid of said originating subscriber's information in the terminating exchange and holding the incoming-call information;

monitoring whether a request for outputting an incoming-call logging list has been received;

if the request has been received, outputting from the terminating exchange, the incoming-call logging list of a requesting subscriber on the basis of the incoming-call information.

25. A communication service method in a communication network having a function for notifying a terminating side of an originating subscriber's number, the method comprising the steps of:

registering, in correspondence with a subscriber's number, whether or not an incoming-call information service is required at a terminating exchange in the communication network;

registering secondary data, which has at least names and addresses of subscribers, in a data base provided in a communication center in advance in correspondence with subscriber's numbers;

indicating to the communication network, from an originating subscriber terminal, whether to permit or prohibit disclosure of information relating to an originating subscriber;

causing the communication network to transmit, permit or prohibit data to the terminating exchange together with an originating subscriber's number;

checking, in the terminating exchange, at the time of termination of an incoming call, whether the terminating subscriber requires the incoming-call information service;

in a case where the terminating subscriber requires the service, creating incoming-call basic data, which includes a terminating subscriber's number, an originating subscriber's number, communication starting time, the permit or prohibit data and communication conditions indicating distinction between finish of a call, termination during communication and no response by the terminating subscriber, at the terminating exchange;

sending the incoming-call basic data to the communication center;

determining whether the disclosure of the information relating to the originating subscriber is prohibited or permitted by reference to said permit or prohibit data in the communication center;

in a case where the disclosure is permitted, retrieving the secondary data conforming to the originating subscriber's number from the data base, combining the secondary data with the incoming-call basic data to create incoming-call information in the communication center, and holding the incoming-call information;

in a case where the disclosure is prohibited, editing incoming-call information devoid of said originating subscriber's information in the communication center and holding the incoming-call information; and monitoring whether a request for outputting an incoming-call logging list has been received, and if the request has been received, outputting from the communication center, the incoming-call logging list of a requesting subscriber on the basis of the incoming-call information.

26. A communication service system in a communication network having a function for notifying a terminating side of an originating subscriber's number, the system comprising:

means for registering, in correspondence with a subscriber's number, whether or not an incoming-call information service is required at a terminating exchange in the communication network;

wherein an originating subscriber indicates to the communication network, whether to permit or prohibit disclosure of information relating to an originating subscriber and the communication network is caused to transmit, permit data or prohibit data to the terminating exchange together with an originating subscriber's number;

means for checking, in the terminating exchange, at the time of termination of an incoming call, whether the terminating subscriber requires the incoming-call information service, and in a case where the terminating subscriber requires the service, creating incoming-call basic data, which includes a terminating subscriber's number, an originating subscriber's number, communication starting time, the permit or prohibit data and communication conditions indicating distinction between finish of a calls termination during communication and no response by the terminating subscriber, at the terminating exchange;

means for holding the incoming-call basic data at the terminating exchange;

means for monitoring whether a request for outputting an incoming-call logging list has been received, and if the request has been received, the terminating exchange outputs the incoming-call logging list of a requesting subscriber on the basis of the incoming-call basic data, wherein in a case where the disclosure of the information relating to the originating subscriber is prohibited, the terminating exchange outputs the incoming-call logging list devoid of said originating subscriber's number and in a case where the disclosure is permitted, the terminating exchange outputs the incoming-call logging list including said originating subscriber's number.

27. The system according to claim 26, further comprising:

means for determining whether the disclosure of the information relating to the originating subscriber is prohibited or permitted by reference to said permit or prohibit data;

means for outputting the incoming-call logging list devoid of said originating subscriber's number in a case where the disclosure is prohibited, and for outputting the incoming-call logging list including said originating subscriber's number in a case where the disclosure is permitted.

28. A communication service system in a communication network having a function for notifying a terminating side of an originating subscriber's number, the system comprising:

means for registering, in correspondence with a subscriber's number, whether or not an incoming-call information service is required at a terminating exchange in the communication network;

means for registering secondary data, which has at least names and addresses of subscribers, in a data base provided in the terminating exchange in advance in correspondence with subscriber's numbers, wherein an originating subscriber indicates to the communication network, whether to permit or prohibit disclosure of information relating to an originating subscriber, the communication network is caused to transmit, permit or prohibit data to the terminating exchange together with an originating subscriber's number;

means for checking, in the terminating exchange, at the time of termination of an incoming call, whether the terminating subscriber requires the incoming-call information service, and in a case where the terminating subscriber requires the service, creating incoming-call basic data, which includes a terminating subscriber's number, an originating subscriber's number , communication starting time, the permit data or prohibit data and communication conditions indicating distinction between finish of a call, termination during communication and no response by the terminating subscriber, at the terminating exchange;

means for determining whether the disclosure of the information relating to the originating subscriber is prohibited or permitted by reference to said permit or prohibit data, and in a case where the disclosure is permitted, retrieving the secondary data conforming to the originating subscriber's number from the data base, combining the secondary data with the incoming-call basic data to create incoming-call information in the terminating exchange, and holding the incoming-call information, and in a case where the disclosure is prohibited, editing incoming-call information devoid of said originating subscriber's information in the terminating exchange and holding the incoming-call information; and means for monitoring whether a request for outputting an incoming-call logging list has been received, and if the request has been received, outputting from the terminating exchange, the incoming-call logging list of a requesting subscriber on the basis of the incoming-call information.

29. A communication service system in a communication network having a function for notifying a terminating side of an originating subcriber's number, the system comprising:

means for registering, in correspondence with a subscriber's number, whether or not an incoming-call information service is required at a terminating exchange in the communication network;

means for registering secondary data, which has at least names and addresses of subscribers, in a data base provided in a communication center in advance in correspondence with subscriber's numbers;

wherein an originating subscriber indicates to the communication network, whether to permit or prohibit disclosure of information relating to an originating subscriber and the communication network is caused to transmit, permit or prohibit data to the terminating exchange together with an originating subscriber's number;

means for checking, in the terminating exchange, at the time of termination of an incoming call, whether the terminating subscriber requires the incoming-call information service, and in a case where the terminating subscriber requires the service, creating incoming-call basic data, which includes a terminating subscriber's number, an originating subscriber's number, communication starting time, the permit date or prohibit data and communication conditions indicating distinction between finish of a call, termination during communication and no response by the terminating subscriber, at the terminating exchange;

means for sending the incoming-call basic data to the communication center;

means for determining whether the disclosure of the information relating to the originating subscriber is prohibited or permitted by reference to said permit or prohibit data in the communication center, and in a case where the disclosure is permitted, retrieving the secondary data conforming to the originating subscriber's number from the data base, combining the secondary data with the incoming-call basic data to create incoming-call information in the communication center, and holding the incoming-call information, and in a case where the disclosure is prohibited, editing incoming-call information devoid of said originating subscriber's information in the communication center and holding the incoming-call information; and means for monitoring whether a request for outputting an incoming-call logging list has been received, and if the request has been received, outputting from the communication center, the incoming-call logging list of a requesting subscriber on the basis of the incoming-call information.

* * * * *